US006995672B1

(12) United States Patent
Yones

(10) Patent No.: US 6,995,672 B1
(45) Date of Patent: Feb. 7, 2006

(54) RELAXATION OSCILLATOR FOR TRANSPONDER

(75) Inventor: Dale Lee Yones, Boulder, CO (US)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 10/049,724

(22) PCT Filed: Dec. 15, 1999

(86) PCT No.: PCT/US99/29890

§ 371 (c)(1),
(2), (4) Date: Nov. 7, 2001

(87) PCT Pub. No.: WO01/44000

PCT Pub. Date: Jun. 21, 2001

Related U.S. Application Data

(60) Provisional application No. 60/134,455, filed on May 17, 1999.

(51) Int. Cl.
G08B 13/14 (2006.01)
(52) U.S. Cl. .................. 340/572.1; 340/657; 340/664; 340/514; 340/635; 340/442; 340/447
(58) Field of Classification Search ............... 340/635, 340/657, 664, 514, 572.1, 442, 447
See application file for complete search history.

(56) References Cited

U.S. PATENT DOCUMENTS

| 3,596,509 A | 8/1971 | Rafaelli |
| 3,893,228 A | 7/1975 | George et al. |
| 4,126,772 A | 11/1978 | Pappas et al. |
| 4,174,515 A | 11/1979 | Marzolf |
| 4,317,216 A | 2/1982 | Kaegebein |
| 4,335,283 A | 6/1982 | Migrin |
| 4,567,459 A | 1/1986 | Folger et al. |
| 4,578,992 A | 4/1986 | Galasko et al. |
| 4,695,823 A | 9/1987 | Vernon |
| 4,701,826 A | 10/1987 | Mikkor |
| 4,703,650 A | 11/1987 | Dosjoub et al. |
| 4,893,110 A | 1/1990 | Hebert |
| 4,909,074 A | 3/1990 | Gerresheim et al. |
| 4,966,034 A | 10/1990 | Bock et al. |
| 5,050,110 A | 9/1991 | Rott |

(Continued)

FOREIGN PATENT DOCUMENTS

EP 0473569 8/1991

(Continued)

Primary Examiner—Julie Bichngoc Lieu
(74) Attorney, Agent, or Firm—Howard M. Cohn

(57) ABSTRACT

A relaxation oscillator for a transponder capable of measuring one or more parameters (e.g., temperature, pressure) in an object and transmitting a data stream to an external reader/interrogator. The transponder typically operates in a passive mode, deriving its power from an RF interrogation signal received by an antenna system, but c=also operate in a battery-powered active mode. The transponder includes memory for storing measurements, calibration data programmable trim settings, transponder ID and the like. Measurement readings comprise counting oscillations of a measurement signal during a fixed time window. The measurement signal is generated by a relaxation oscillator driven by the alternating charging and discharging of measurement capacitors. wherein the capacitor charging rate is a function of current, and of capacitance. By using a mirror measurement current lo discharge the measurement capacitors, the discharge rate is made approximately equal to the charge rate. The measurement current can be scaled according to programmed trim settings to independently optimize readings for the different measured parameters.

25 Claims, 8 Drawing Sheets

U.S. PATENT DOCUMENTS

| | | |
|---|---|---|
| 5,054,315 A | 10/1991 | Dosjoub |
| 5,140,851 A | 8/1992 | Hettich et al. |
| 5,230,243 A | 7/1993 | Reinecke |
| 5,231,872 A | 8/1993 | Bowler et al. |
| 5,285,189 A | 2/1994 | Nowicki et al. |
| 5,297,424 A | 3/1994 | Sackett |
| 5,368,082 A | 11/1994 | Oare et al. |
| 5,418,358 A | 5/1995 | Bruhnke et al. |
| 5,451,959 A | 9/1995 | Schuermann |
| 5,528,452 A | 6/1996 | Ko |
| 5,540,092 A | 7/1996 | Handfield et al. |
| 5,562,787 A | 10/1996 | Koch et al. |
| 5,581,023 A | 12/1996 | Handfield et al. |
| 5,661,651 A | 8/1997 | Geshke et al. |
| 5,706,565 A | 1/1998 | Sparks et al. |
| 5,731,754 A | 3/1998 | Lee, Jr. et al. |
| 5,824,891 A | 10/1998 | Monson |
| 6,452,427 B1 * | 9/2002 | Ko et al. .................... 327/101 |

FOREIGN PATENT DOCUMENTS

| | | |
|---|---|---|
| EP | 0583690 | 8/1993 |
| EP | 0832765 | 4/1998 |
| FR | 2764977 | 12/1998 |
| WO | WO99/52723 | 10/1999 |
| WO | WO00/02028 | 1/2000 |
| WO | WO00/69663 | 11/2000 |
| WO | WO00/70552 | 11/2000 |
| WO | WO01/43999 | 6/2001 |

* cited by examiner

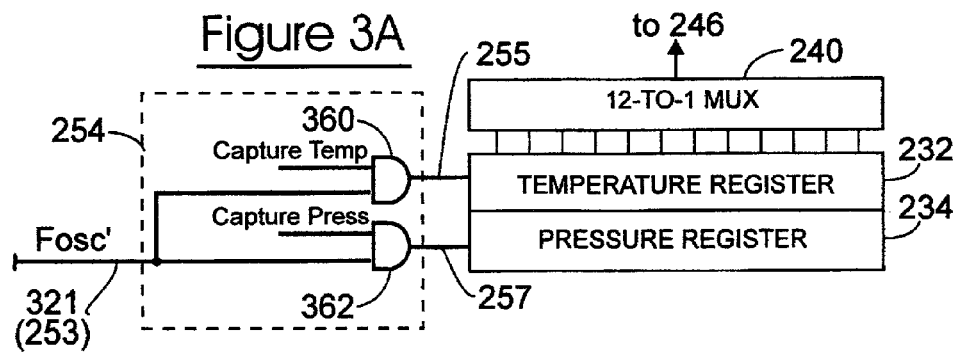
Figure 3A
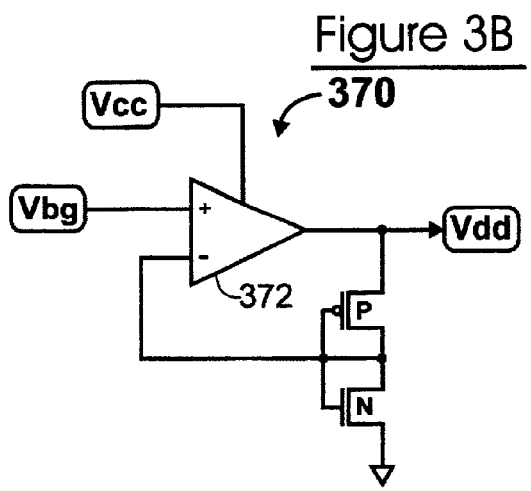
Figure 3B
Figure 3C
| ←—12 COLUMNS—→ | |
|---|---|
| ROW 1 | SYNC 000..011 |
| ROW 2 | DATA 012..023 |
| ROW 3 | DATA 024..035 |
| ROW 4 | DATA 036..047 |
| ROW 5 | DATA 048..059 |
| ROW 6 | DATA 060..071 |
| ROW 7 | DATA 072..082, MTMS 083 |
| ROW 8 | TEMP COMP 084..095 |
| ROW 9 | PRESS COMP 096..107 |
| ROW 10 | TEMP/PRESS SLOPES 108..113, 114..119 |
| ROW 11 | TEMP COUNT (NT) 120..131 |
| ROW 12 | PRESS COUNT (NP) 132..143 |

Figure 4B

| EEPROM LOCATION | DATA STREAM | ←12-BIT WORDS→ | |
|---|---|---|---|
| ROW 1 | WORD 1 | SYNC WORD (12) | 12-BIT SYNC WORD |
| ROW 2 | WORD 2 | ID (12) | }<br>48 BITS<br>OF USER ID |
| ROW 3 | WORD 3 | ID (12) | |
| ROW 4 | WORD 4 | ID (12) | |
| ROW 5 | WORD 5 | ID (12) | |
| ROW 6 | WORD 6 | TEMPERATURE CALIBRATION (12) | }<br>48 BITS OF<br>TEMPERATURE &<br>PRESSURE<br>CALIBRATION DATA |
| ROW 7 | WORD 7 | TEMPERATURE CALIBRATION (12) | |
| ROW 8 | WORD 8 | PRESSURE CALIBRATION (12) | |
| ROW 9 | WORD 9 | PRESSURE CALIBRATION (12) | |
| ROW 10 | WORD 10 | CHIP ID (12) | }<br>36 BITS OF<br>TRANSPONDER<br>CHIP ID |
| ROW 11 | WORD 11 | CHIP ID (12) | |
| ROW 12 | WORD 12 | CHIP ID (12) | |
| ROW 13 | WORD 13 | CAL ID (4) \| CRC (8) | 4-BIT CALIBRATION ID AND 8-BIT CRC |
| | WORD 14 | TEMPERATURE NT (12) | } TEMPERATURE (NT) AND PRESSURE (NP) DATA REGISTERS |
| | WORD 15 | PRESSURE NP (12) | |
| | WORD 16 | OPEN (5),MTMS(1) NP, NT PARITY(6) | 11111, MTMS STATUS, AND PARITY OF NP, NT DATA |

| ROW 14 | | TRIMMING BITS (12) | } 12-BIT TRIMMING REGISTER |
|---|---|---|---|
| ROW 15 | | TRIMMING INVERSE BITS (12) | |

RELAXATION OSCILLATOR FOR TRANSPONDER

CROSS-REFERENCE TO RELATED APPLICATIONS

This application is a national stage entry of PCT/US 99/29890 entitled "Relaxation Oscillator For Transponder" filed Dec. 15, 1999.

This application relates to PCT applications Serial no. PCT/US99/29723 entitled POWER ON RESET FOR TRANSPONDER, Serial No. PCT/US99/29827, entitled PROGRAMMABLE MODULATION INDEX FOR TRANSPONDER and Serial No. PCT/US99/29840 entitled PROGRAMMABLE TRIMMING FOR TRANSPONDER, each having a filing date concurrent with that of the present application.

This application is a continuation-in-part of commonly-owned, copending PCT application Serial Nos. PCT/U99/29668 and PCT/US99/29606 both filed on 14 Dec. 1999, which in turn are continuation-in-part of commonly-owned, copending PCT application Serial Nos. PCT/US98/07338, PCT/US99/07836 and PCT/US99/07575 all filed on 14 Apr. 1998.

This application claims the benefit of U.S. Provisional Patent Application No. 60/134,455, filed May 17, 1999 by Yones.

TECHNICAL FIELD OF THE INVENTION

The present invention relates to monitoring pressure and temperature and, more particularly in conjunction with transponders associated with the tires for transmitting pressure and temperature measurements to an external (e.g., on-board) receiver (reader, or reader/interrogator).

BACKGROUND OF THE INVENTION

Safe, efficient and economical operation of a motor vehicle depends, to a significant degree, on maintaining correct air pressure in all (each) of the tires of the motor vehicle. Operating the vehicle with low tire pressure may result in excessive tire wear, steering difficulties, poor road-handling, and poor gasoline mileage, all of which are exacerbated when the tire pressure goes to zero in the case of a "flat" tire.

The need to monitor tire pressure when the tire is in use is highlighted in the context of "run-flat"(driven deflated) tires, tires which are capable of being used in a completely deflated condition. Such run-flat tires, as disclosed for example in commonly-owned U.S. Pat. No. 5,368,082, incorporated in its entirely by reference herein, may incorporate reinforced sidewalls, mechanisms for securing the tire head to the rim, and a non-pneumatic tire (donut) within the pneumatic tire to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers) prior to getting the tire repaired, rather than stopping on the side of the road to repair the deflated tire. Hence, it is generally desirable to provide a low tire pressure warning system within in the vehicle to alert (e.g., via a light or a buzzer) the driver to the loss of air pressure in a pneumatic tire.

To this end, a number of electronic devices and systems are known for monitoring the pressure of pneumatic tires, and providing the operator of the vehicle with either an indication of the current tire pressure or alerting the operator when the pressure has dropped below a predetermined threshold level.

For example, U.S. Pat. No. 4,578,992 (Galasko, et al; 04/86), incorporated in its entirety herein, discloses a tire pressure indicating device including a coil and a pressure-sensitive capacitor forming a passive oscillatory circuit having a natural resonant frequency which varies with tire pressure due to changes caused to the capacitance value of the capacitor. The circuit is energized by pulses supplied by a coil positioned outside the tire and secured to the vehicle, and the natural frequency of the passive oscillatory circuit is detected. The natural frequency of the coil/capacitor circuit is indicative of the pressure on the pressure-sensitive capacitor.

It is also known to monitor tire pressure with an electronic device which is not merely a passive resonant circuit, but rather is capable of transmitting a radio frequency (RF) signal indicative of the tire pressure to a remotely-located receiver. Such a "transmitting device" may have its own power supply and may be activated only when the pressure drops below a predetermined threshold. Alternatively, the transmitting device may be activated ("turned ON") by an RF signal from the remotely-located receiver, in which case the receiver is considered to be an "interrogator". Additionally, the transmitting device may be powered by an RF signal from the interrogator. Additionally, the electronic device which monitors the tire pressure may have the capability of receiving information from the interrogator, in which case the electronic device is referred to as a "transponder".

As used herein, a "transponder" is an electronic device capable of receiving and transmitting radio frequency signals, and impressing variable information (data) in a suitable format upon the transmitted signal indicative of a measured condition (e.g., tire pressure) or conditions (e.g., tire pressure, temperature, revolutions), as well as optionally impressing fixed information (e.g., tire ID) on the transmitted signal, as well as optionally responding to information which may be present on the received signal. The typical condition of paramount interest for pneumatic tires is tire pressure. "Passive" transponders are transponders powered by the energy of a signal received from the interrogator. "Active" transponders are transponders having their own power supply (e.g., a battery), and include active transponders which remain in a "sleep" mode, using minimal power, until "woken up" by a signal from an interrogator, or by an internal periodic timer, or by an attached device. As used herein, the term "tag" refers either to a transponder having transmitting and receiving capability, or to a device that has only transmitting capability. Generally, tags which are transponders are preferred in the system of the present invention. As used herein, the term "tire-pressure monitoring system" (TPMS) indicates an overall system comprising tags within the tires and a receiver which may be an interrogator disposed within the vehicle.

It is known to mount a tag, and associated condition sensor (e.g., pressure sensor) within each tire of a vehicle, and to collect information from each of these transponders with a common single interrogator (or receiver), and to alert a driver of the vehicle to a low tire pressure condition requiring correction (e.g., replacing the tire). For example, U.S. Pat. No. 5,540,092 (Handfield, et al.; 1996), incorporated in its entirety by reference herein, discloses a system and method for monitoring a pneumatic tire. FIG. 1 therein illustrates a pneumatic tire monitoring system (20) comprising a transponder (22) and a receiving unit (24).

Examples of RF transponders suitable for installation in a pneumatic tire are disclosed in U.S. Pat. No. 5,451,959 (Schuermann; 09/95), U.S. Pat. No. 5,661,651 (Geschke, et al.; 08/97), and U.S. Pat. No. 5,581,023 (Handfield, et al.; 12/96), all incorporated in their entirety by reference herein. The described transponder systems include interrogation units, pressure sensors and/or temperature sensors associated with the transponder, and various techniques for establishing the identity of the tire/transponder in multiple transponder systems. In most cases, such transponders require battery power.

In some instances, a transponder may be implemented as an integrated circuit (IC) chip. Typically, the IC chip and other components are mounted and/or connected to a substrate such as a printed circuit board (PCB).

Some proposed systems have relatively complex transponder-sensor capabilities, including measurement and reporting of tire rotations and speed, along with tire ID, temperature, and pressure. For example: U.S. Pat. No. 5,562,787 (Koch, et al.; 1996), and U.S. Pat. No. 5,731,754 (Lee, Jr., et al.; 1998), incorporated in their entirety by reference herein.

Transponder Environmental Considerations

The environment within which a tire-mounted transponder must reliably operate, including during manufacture and in use, presents numerous challenges to the successful operation of the transducer. For example, the sensors (e.g., pressure, temperature) used with the transponder preferably will have an operating temperature range of up to 125° C., and should be able to withstand a manufacturing temperature of approximately 177° C. For truck tire applications, the pressure sensor must have an operating pressure range of from about 50 psi to about 120 psi (from about 345 kPa to about 827 kPa), and should be able to withstand pressure during manufacture of the tire of up to about 400 psi (about 2759 kPa). The accuracy, including the sum of all contributors to its inaccuracy, should be on the order of plus or minus 3% of full scale. Repeatability and stability of the pressure signal should fall within a specified accuracy range.

However it is implemented, a tire transponder (tag) must therefore be able to operate reliably despite a wide range of pressures and temperatures. Additionally, a tire transponder must be able to withstand significant mechanical shocks such as may be encountered when a vehicle drives over a speed bump or a pothole.

A device which can be used to indicate if a transponder or the tire has been exposed to excessive, potentially damaging temperatures is the "MTMS" device or Maximum Temperature Memory Switch developed by. Prof. Mehran Mehregany of Case Western Reserve University. It is a micro-machined silicon device that switches to a closed state at a certain high-temperature point. The sensor switches from an "open" high resistance state of, for example, over 1 mega-ohm to a "closed" low resistance state of, for example, less than 100 ohm.

Although it is generally well known to use pressure transducers in pneumatic tires, in association with electronic circuitry for transmitting pressure data, these pressure-data systems for tires have been plagued by difficulties inherent in the tire environment. Such difficulties include effectively and reliably coupling RF signals into and out of the tire, the rugged use the tire and electronic components are subjected to, as well as the possibility of deleterious effects on the tire from incorporation of the pressure transducer and electronics in a tire/wheel system. In the context of "passive" RF transponders which are powered by an external reader/interrogator, another problem is generating predictable and stable voltage levels within the transponder so that the circuitry within the transponder can perform to its design specification.

Suitable pressure transducers for use with a tire-mounted transponder include:
(a) piezoelectric transducers;
(b) piezoresistive devices, such as are disclosed in U.S. Pat. No. 3,893,228 (George, et al.; 1975) and in U.S. Pat. No. 4,317,216 (Gragg, Jr.; 1982);
(c) silicon capacitive pressure transducers, such as are disclosed in U.S. Pat. No. 4,701,826 (Mikkor; 1987), U.S. Pat. No. 5,528,452 (Ko; 1996), U.S. Pat. No. 5,706,565 (Sparks, et al.; 1998), and PCT/US99/16140 (Ko, et al.; filed Jul. 7, 1999);
(d) devices formed of a variable-conductive laminate of conductance ink; and
(e) devices formed of a variable-conductance elastomeric composition.

The Effect of Temperature on Gas Pressure

In a broad sense, for a mass of any gas in a state of thermal equilibrium, pressure P, temperature T, and volume V can readily be measured. For low enough values of the density, experiment shows that (1) for a given mass of gas held at a constant temperature, the pressure is inversely proportional to the volume (Boyle's law), and (2) for a given mass of gas held at a constant pressure, the volume is directly proportional to the temperature (law of Charles and Gay-Lussac). This leads to the "equation of state" of an ideal gas, or the "ideal gas law":

$PV = \mu RT$ where:

$\mu$ is the mass of the gas in moles; and

R is a constant associated with the gas.

Thus, for a contained (fixed) volume of gas, such as air contained within a pneumatic tire, an increase in temperature (T) will manifest itself as an increase in pressure (P).

Because of the ideal gas law relationship, it is recognized that in the context of pneumatic tires, one problem that arises during operation of tire pressure sensors of any kind is that tires heat up as they are run for longer periods of time. When a tire heats up, air which is confined within the essentially constant and closed volume of the tire expands, thus causing increased pressure within the tire, though the overall amount of air within the tire remains the same. Since the pressure nominally is different, a tire pressure sensor can provide different pressure readings when a tire is hot than would be the case if the tire were cold. This is why tire and vehicle manufacturers recommend that owners check their tire pressure when the tire is cold. Of course, with a remote tire pressure sensor, an operator may receive a continuous indication of tire pressure within the vehicle, but the indication may be inaccurate because of the temperature change. Thus, it is necessary to compensate for changes in temperature of the inflating medium ("gas" or air) within the pneumatic tire.

Patents dealing in one way or another with gas law effects in pneumatic tires include: U.S. Pat. No. 3,596,509 (Raffelli; 1971), U.S. Pat. No. 4,335,283 (Migrin; 1982), U.S. Pat. No. 4,126,772 (Pappas, et al.; 1978), U.S. Pat. No. 4,909,074 (Gerresheim, et al.; 1990), U.S. Pat. No. 5,050,110 (Rott; 1991), U.S. Pat. No. 5,230,243 (Reinecke; 1993), U.S. Pat. No. 4,966,034 (Bock, et al.; 1990), U.S. Pat. No. 5,140,851

(Hettrich, et al.; 1992), U.S. Pat. No. 4,567,459 (Folger, et al.; 1986), all of which are incorporated in their entirety by reference herein.

U.S. Pat. No. 4,893,110 (Hebert; 1990), incorporated in its entirety by reference herein, discloses a tire monitoring device using pressure and temperature measurements to detect anomalies. As mentioned therein, a ratio of temperature and pressure provides a first approximation of a number of moles of gas in the tire, which should remain constant barring a leak of inflation fluid from the tire. (column 1, lines 18–26). More particularly, on each wheel are installed sensors (4) for pressure and sensors (6) for temperature of the tire, as well as elements (8 and 10) for transmitting the measured values as coded signals to a computer (12) on board the vehicle, such as disclosed in the aforementioned U.S. Pat. No. 4,703,650. The computer processes the measured values for pressure and temperature for each tire, and estimates for the pressure/temperature ratio (P/T estimate) are calculated for each wheel. Generally, the ratio for one of the tires is compared with the ratio for at least another one of the tires, and an alarm is output when a result (N) of the comparison deviates from a predetermined range of values.

Techniques for Transmitting Pressure and Temperature Readings from a Tire

Given that pressure and temperature conditions within a pneumatic tire can both be measured, various techniques have been proposed to transmit signals indicative of the measured pressure and temperature conditions to an external interrogator/receiver. For example, the following patents are incorporated in their entirety by reference herein:

- transmit the signals individually, distinguished by phase displacements: U.S. Pat. No. 4,174,515 (Marzolf; 1979);
- multiplex the signals: U.S. Pat. No. 5,285,189 (Nowicki, et al.; 1994), U.S. Pat. No. 5,297,424 (Sackett; 1994);
- encoding the signals as separate segments of a data word: U.S. Pat. No. 5,231,872 (Bowler, et al.; 1993), and U.S. Pat. No. 4,695,823 (Vernon; 1987) which also incorporates both the telemetry and the pressure and/or temperature sensors on the same integrated circuit chip;
- transmission between coils mounted on the wheel and on the vehicle: U.S. Pat. No. 4,567,459 (Folger, et al.; 1986);
- use a frequency-shift key (FSK) signal: U.S. Pat. No. 5,228,337 (Sharpe, et al.; 1993);
- backscatter-modulate the RF signal from the interrogator with the tire condition parameter data from the sensors, then return the backscatter modulated signal to the interrogator: U.S. Pat. No. 5,731,754 (Lee, Jr., et al.; 1998).

U.S. Pat. No. 4,703,650 (Dosjoub, et al.; 1987), incorporated in its entirety by reference herein, discloses a circuit for coding the value of two variables measured in a tire, and a device for monitoring tires employing such a circuit. The coding circuit comprises an astable multivibrator which transforms the measurement of the variables, for instance pressure and temperature, into a time measurement. The astable multivibrator delivers a pulse signal whose pulse width is a function of the temperature and the cyclic ratio of which is a function of the pressure.

U.S. Pat. No. 5,054,315 (Dosjoub; 1991), incorporated in its entirety by reference herein, discloses a technique for coding the value of several quantities measured in a tire. As disclosed therein:

"Coding of the value of any number of quantities measured in a tire, for example its pressure and its temperature, is carried out using a ratio of time intervals TP/Tr, Tt/Tr. This frees the device from the effect of the time shift of the modulation system, the time shift affecting simultaneously the numerator and the denominator of said ratio." (Abstract)

SUMMARY OF THE INVENTION

According to an aspect of the invention, a radio-frequency (RF) transponder comprises circuitry capable of transmitting information unique to an object with which the transponder is associated to an external reader/interrogator. Additionally, one or more transponder sensors (transducers) provide real-time parameter measurement at the transducer location. These measurements are transmitted to the external reader/interrogator, in the form of data in a data stream, on a signal which is output by the transponder, such as by impressing (modulating) the data stream onto an RF signal transmitted by the transponder to the external reader/interrogator.

According to an aspect of the invention, typically two real-time parameters are measured: pressure and temperature. Pressure is preferably measured by a separate ("off-chip") pressure sensor, which is of a type that varies its capacitance value in a known way, such as a polynomial, or preferably as a substantially linear function of ambient pressure. Preferably, the temperature sensor is embedded ("on-chip") in the IC chip of the transponder and disposed so as to be subject to substantially the same ambient temperature as the pressure sensor so that a true, temperature-compensated pressure can readily be calculated.

According to an aspect of the invention, the transponder comprises a measurement current source for providing a measurement current to a relaxation oscillator, the relaxation oscillator comprising a measurement switching circuit, a set-reset circuit having a first phase path and a second phase path, and an output, characterized by: a logic circuit; a measurement capacitor disposed in the measurement switching circuit; a first transistor, controlled by the logic circuit, for directing the measurement current for charging the measurement capacitor; and a current mirror, having transistors controlled by the logic circuit, for mirroring the measurement current in a second transistor, for discharging the measurement capacitor; wherein the logic circuit provides measurement control signals for combining signals indicating the phase of the set-reset circuit with signals from a timing generator for controlling alternating charging and discharging of the measurement capacitor according to the phase of the set-reset circuit.

According to features of this aspect of the invention: the measurement current is indicative of a measured parameter (e.g., ambient temperature), and the measurement capacitor has a fixed capacitance value, so that the relaxation oscillator output is a signal having a frequency indicative of the measured parameter. Alternatively, the measurement capacitor has a capacitance value which varies indicative of a measured parameter (e.g., ambient pressure), so that the relaxation oscillator output is a signal having a frequency indicative of the measured parameter. Alternatively, the measurement current is indicative of a first measured parameter and the measurement capacitor has a capacitance value which varies indicative of a second measured parameter, so that the relaxation oscillator output is a signal having a frequency indicative of both the first measured parameter and the second measured parameter. A programmable current scaling circuit can be interposed between the measurement current source and the relaxation oscillator so that the measurement current is a scaled current, wherein the scaling circuit comprises switches which are controlled by a setting of at least one programmable trim bit and each switch is connected in series with at least one scaling transistor, for varying the scaled measurement current according to the programmable trim settings. The relaxation oscillator can be further characterized by two comparators in the set-reset circuit which compare the measurement capacitor voltage to a first fixed reference voltage and to a second fixed reference voltage which is smaller than the first fixed reference voltage, so that the relaxation oscillator oscillates between the two fixed reference voltages. A bias control transistor, controlled by the logic circuit, can be added for connecting a small bias current to the current mirror for discharging the measurement capacitor.

According to an aspect of the invention, the relaxation oscillator can comprise a first and a second measurement switching circuit, each having a measurement capacitor and a switch controlling which measurement switching circuit provides voltages to the set-reset circuit. When in use for a measurement, each measurement switching circuit functions similarly to the individual measurement switching circuit described hereinabove. Typically, the measurement current is indicative of a measured parameter (e.g., temperature), and the first measurement capacitor has a fixed capacitance value, so that the relaxation oscillator output is a signal having a frequency indicative of the first measured parameter, when the first measurement circuit is in use for measurement and the first switch is closed and the second switch is open; and the second measurement capacitor has a capacitance value which varies indicative of a second measured parameter (e.g., pressure), so that the relaxation oscillator output is a signal having a frequency indicative of both the first measured parameter and the second measured parameter, when the second measurement circuit is in use for measurement and the first switch is open and the second switch is closed. As described hereinabove, a programmable current scaling circuit can be interposed between the measurement current source and the relaxation oscillator so that the measurement current used by the first and second measurement circuits in the relaxation oscillator is a scaled current. Furthermore, the programmable scaling circuit switches can be controlled in a way which provides different scaling factors for the scaled measurement currents used by the two measurement switching circuits.

According to an aspect of the invention, a method is described for generating an oscillating measurement signal in an RF transponder such as described hereinabove, wherein the frequency of the oscillating measurement signal is indicative of a measured parameter. The method primarily consists of alternately directing the measurement current for charging the measurement capacitor, and then directing a mirrored measurement current for discharging the measurement capacitor in each measurement switching circuit of the relaxation oscillator. The measurement switching circuits can be supplied with measurement currents programmably scaled in a way which optimizes the measurement signal frequency to produce an optimized reading for each measured parameter. The measurement capacitor(s) can be placed in a defined state by grounding each when it is not in use for a measurement, and the set-reset circuit can likewise be placed in a defined state by providing it with grounded inputs when it is not in use for a measurement. Finally, by providing a delay between the time when the relaxation oscillator starts and the time when the measurement signal is gated to a measurement counter/register, the relaxation oscillator can stabilize before a reading of the measured parameter begins.

Other objects, aspects, features and advantages of the invention will become apparent from the description that follows.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views, if any, presented herein may be in the form of "slices", or "near-sighted" cross-sectional views, omitting certain background lines which would otherwise be visible in a true cross-sectional view, for illustrative clarity.

Figure 1:
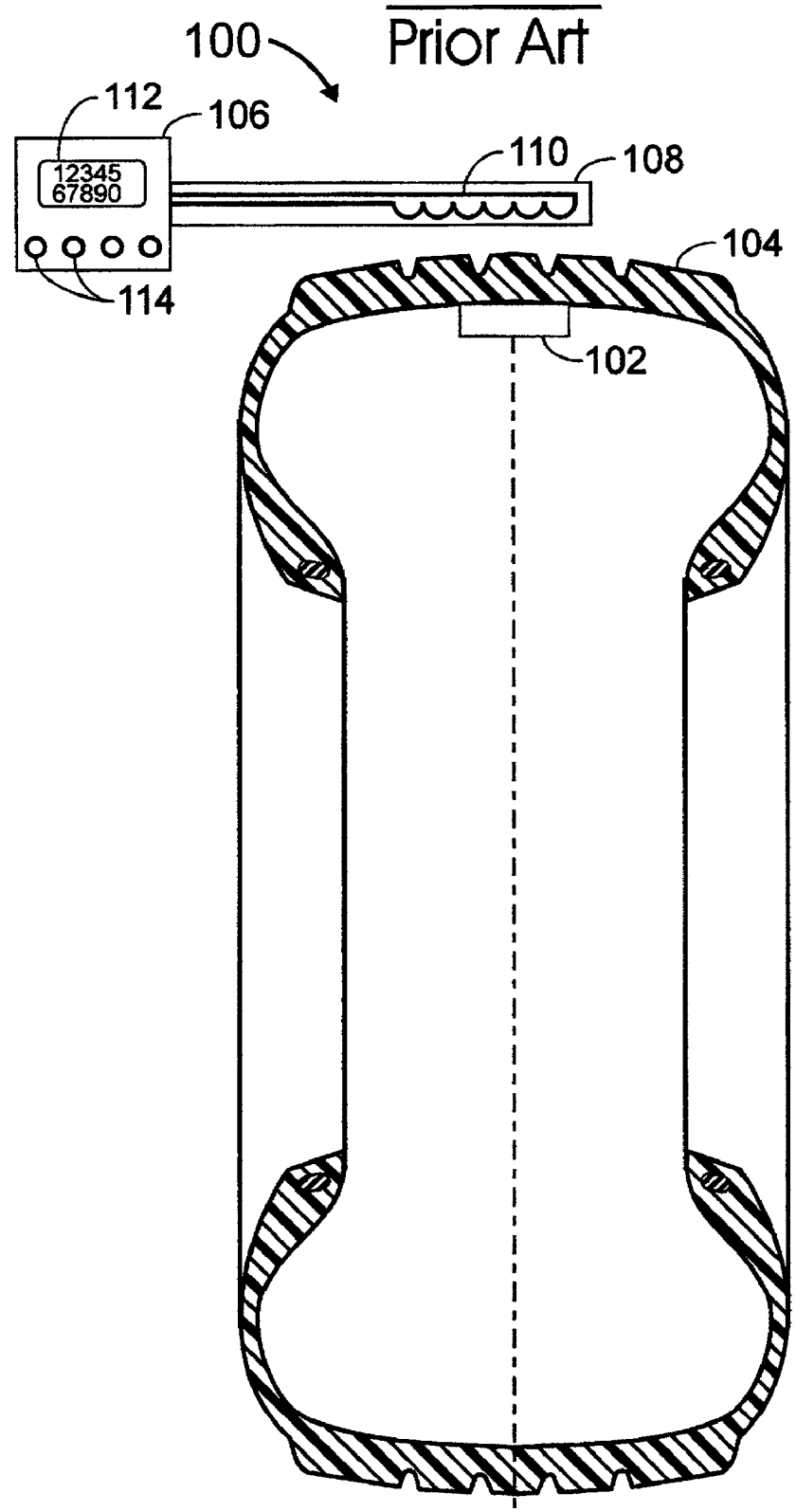
Figure 2:
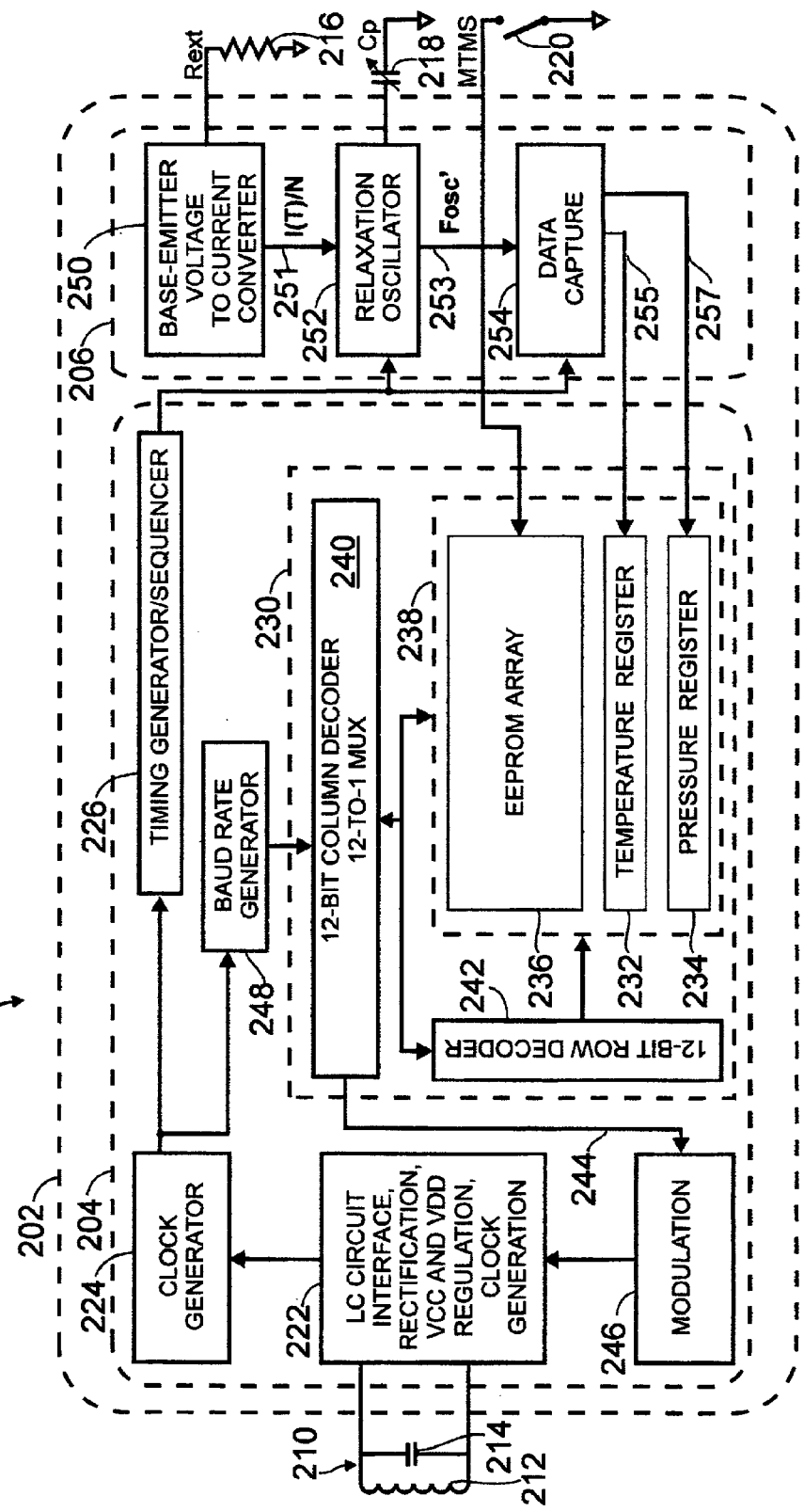
Figure 3:
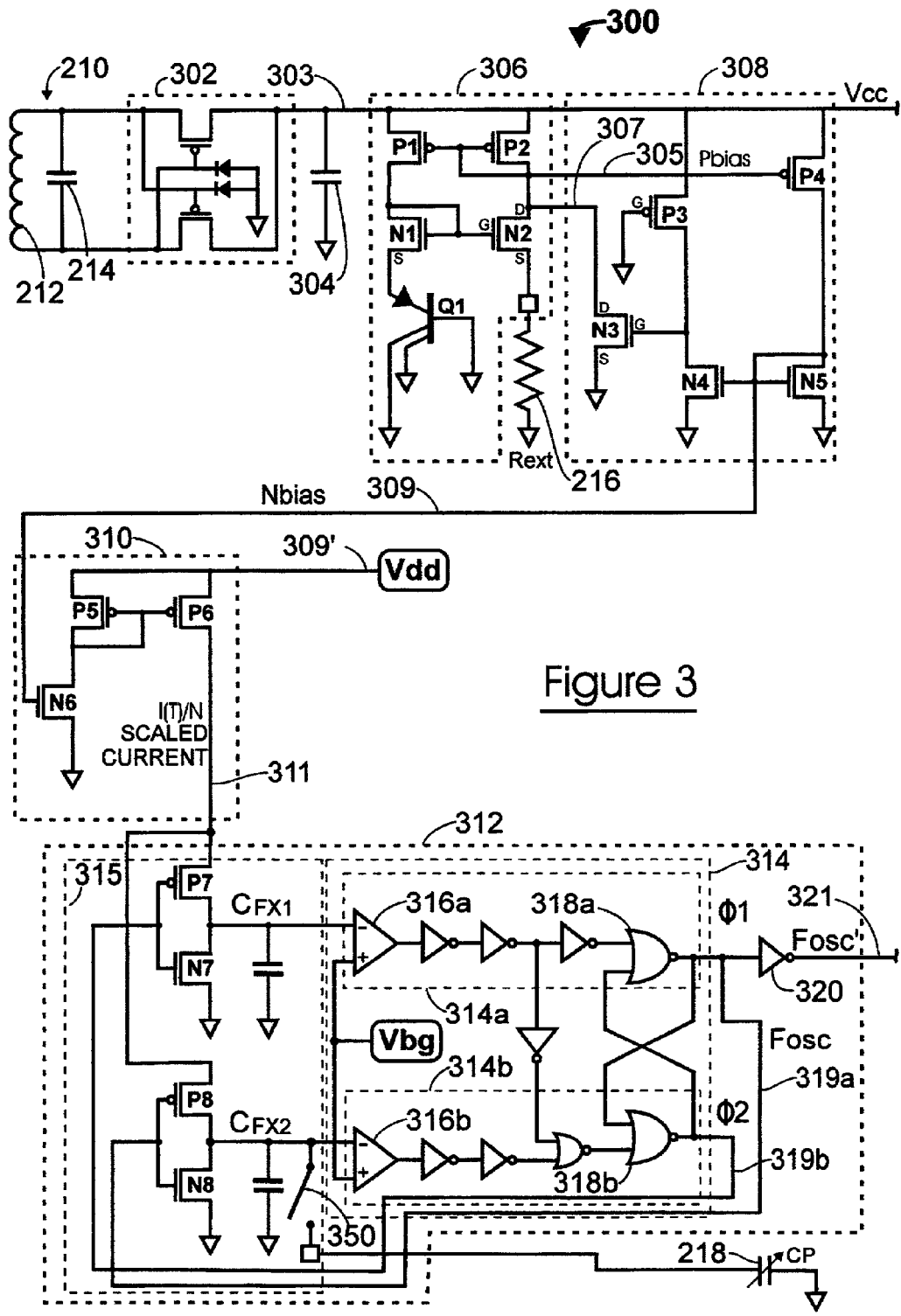
Figure 3D:
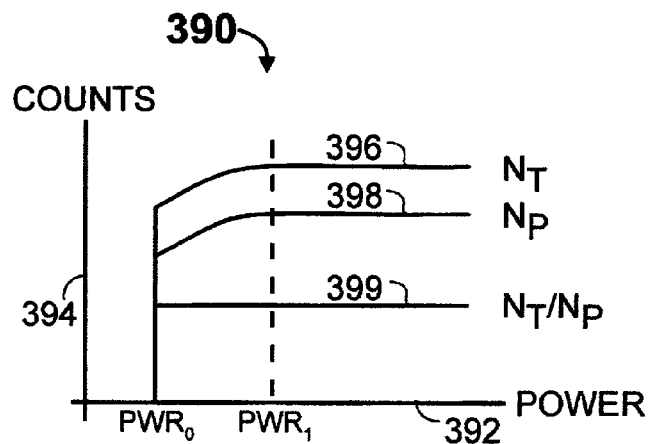
Figure 5A:
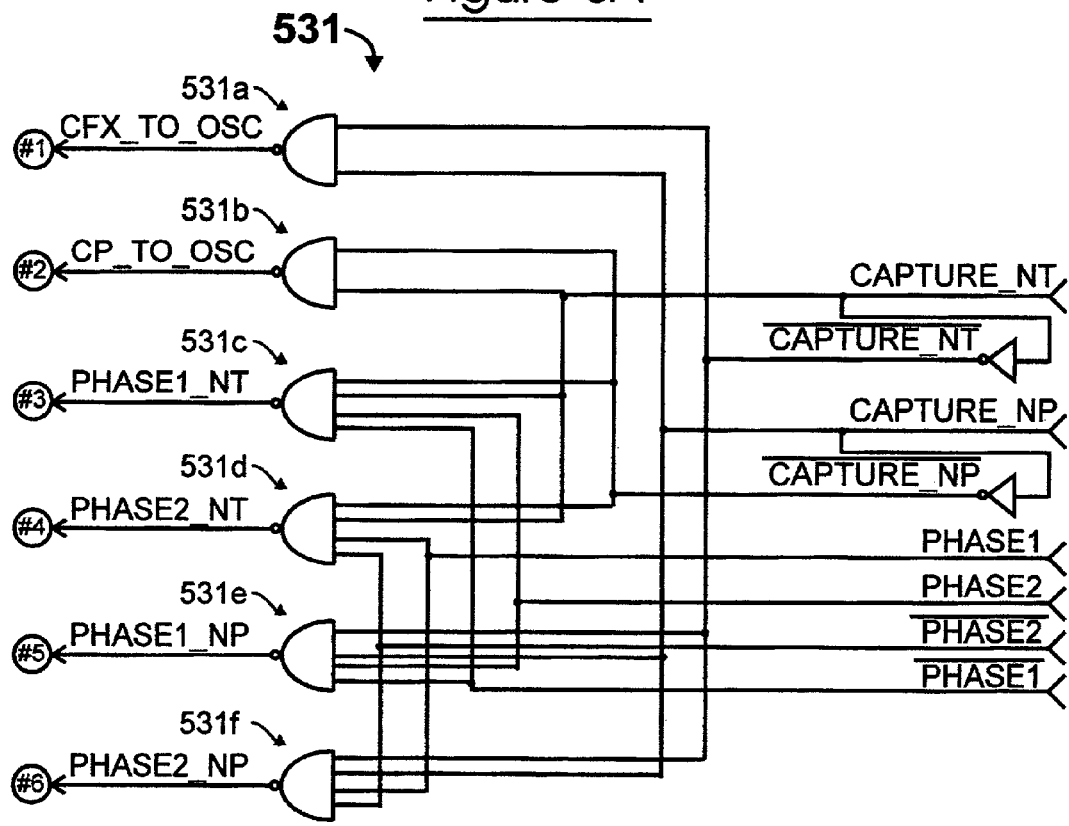
Figure 4A:
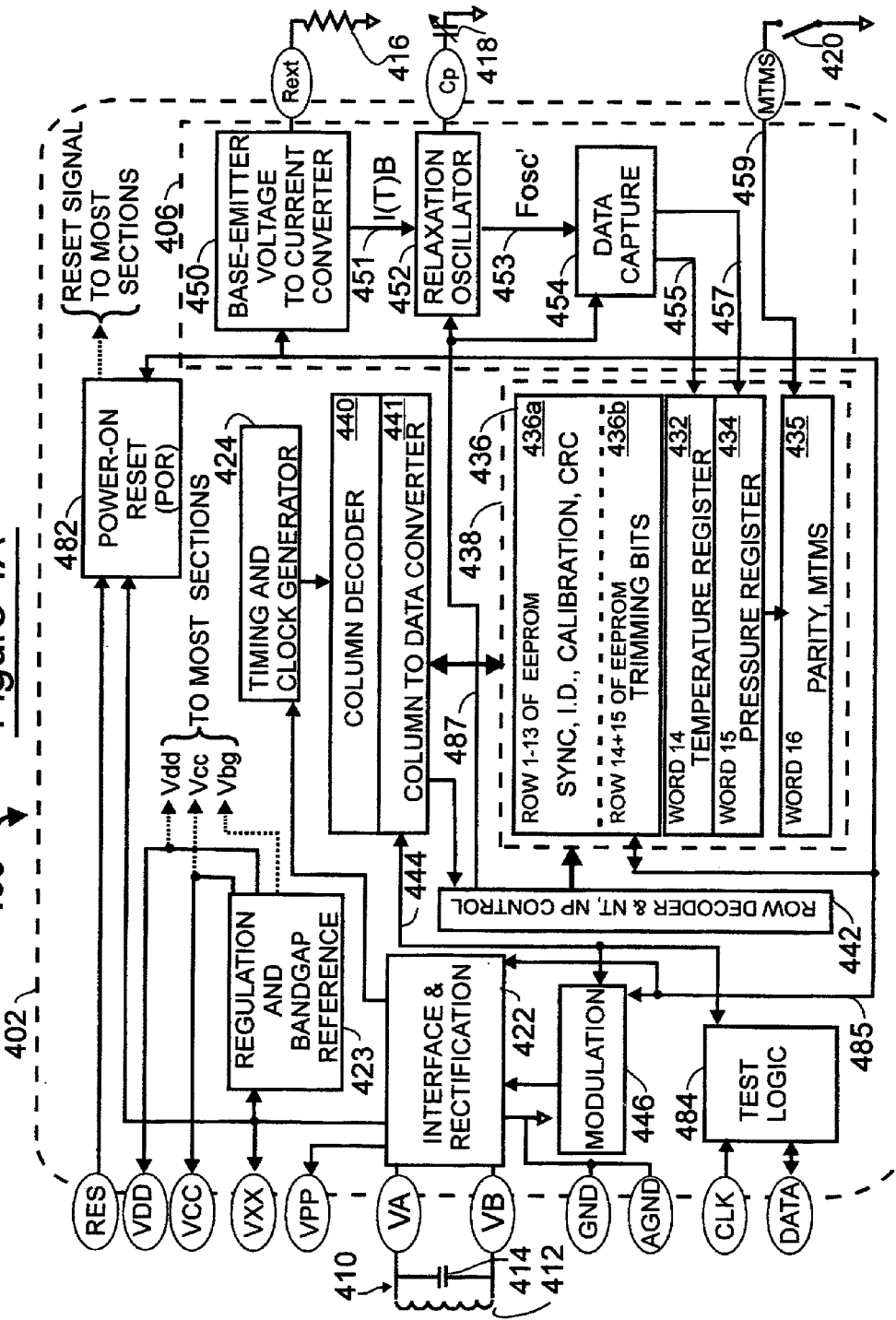
Figure 5:
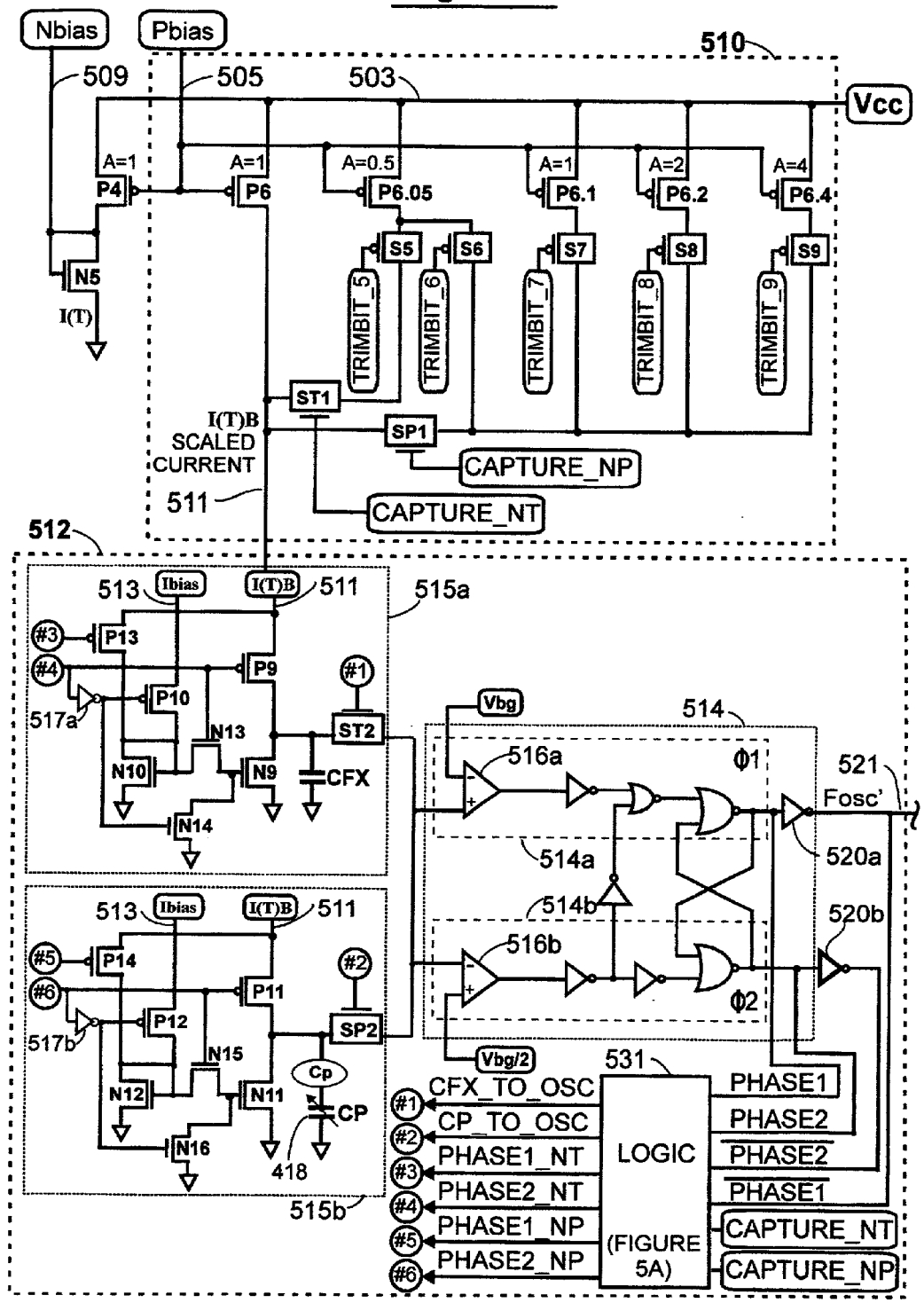

The structure, operation, and advantages of the present preferred embodiment of the invention will become further apparent upon consideration of the following description taken in conjunction with the accompanying drawings, wherein:

FIG. 1 is a generalized diagram of an RF transponder system comprising an external reader/interrogator and an RF transponder within a pneumatic tire, according to the prior art;

FIG. 2 is a block diagram of major components of an RF transponder, according to a previous model of the invention;

FIG. 3 is a schematic diagram of major portions of the RF transponder of FIG. 2, according to a previous model of the invention;

FIG. 3A is a schematic diagram of a portion of the RF transponder of FIG. 2, according to a previous model of the invention;

FIG. 3B is a schematic diagram of a portion of the RF transponder of FIG. 2, according to a previous model of the invention;

FIG. 3C is a diagram of a memory space within the RF transponder of FIG. 2, illustrating how data may be arranged and transmitted, according to a previous model of the invention;

FIG. 3D is a plot of transponder readings versus transponder power for the RF transponder of FIG. 2, according to a previous model of the invention;

FIG. 4A is a block diagram of major components of an RF transponder, according to the invention;

FIG. 4B is a diagram of a memory space within the RF transponder of FIG. 4A, illustrating how data may be arranged and transmitted, according to the invention;

FIG. 5 is a schematic diagram of a current scaling portion and a relaxation oscillator portion of the RF transponder of FIG. 4A, according to the invention; and FIG. 5A is a schematic diagram of a logic portion of the relaxation oscillator portion of FIG. 5, according to the invention.

DETAILED DESCRIPTION OF THE INVENTION

As mentioned hereinabove, it is an object of the present invention to provide a system for monitoring vehicle tire pressure and warning the driver when a low tire inflation pressure condition occurs.

FIG. 1 illustrates an RF transponder system 100 of the prior art, comprising an RF (radio frequency) transponder 102 disposed within (e.g., mounted to an inner surface of) a pneumatic tire 104. (An antenna, not shown, is mounted within the tire 104 and is connected to the transponder 102.) The transponder 102 is an electronic device, capable of transmitting an RF signal comprising unique identification (ID) information (e.g., its own serial number, or an identifying number of the object with which it is associated -in this example, the tire 104) as well as data indicative of a parameter measurement such as ambient pressure sensed by a sensor (not shown) associated with the transponder 102 to an external reader/interrogator 106. The external reader/interrogator 106 provides an RF signal for interrogating the transponder 102, and includes a wand 108 having an antenna 110, a display panel 112 for displaying information transmitted by/from the transponder 102, and controls (switches, buttons, knobs, etc.) 114 for a user to manipulate the functions of the reader/interrogator 106. Although shown as a hand-held device, the reader/interrogator may be an electronic unit mounted in a vehicle (not shown). The present invention is directed primarily to implementing an RF transponder.

As is known, the ID and/or parameter measurement information may be encoded (impressed) in a variety of ways on the signal transmitted by the transponder 102 to the reader/interrogator 106, and subsequently "de-coded" (retrieved) in the reader/interrogator 106 for display to the user. The RF transponder 102 may be "passive", in that it is powered by an RF signal generated by the external reader/interrogator 106 and emitted by the antenna 108. Alternatively, the RF transponder 102 may be "active", in that it is battery-powered. Transponder systems such as the transponder system 100 described herein are well known.

Commonly-owned, copending PCT Patent Application No. PCT/US98/07338 filed 14 Apr. 1998 by Pollack, Brown, Black, and Yones (status: pending), incorporated in its entirety by reference herein, discloses a transponder, particularly a "passive" transponder which derives its operating power from an external radio frequency (RF) source, and which is associated with a pneumatic tire for use in tire identification and transmission of pressure and/or temperature data.

The aforementioned patent application PCT/US98/07338 discloses a transponder which is a previous model (model number "3070C") of the transponder of the present invention. Since the present invention involves commonalities with, as well as improvements upon the previous model, relevant portions of the previous model will be described hereinbelow, with reference to FIGS. 2, 3, 3A, 3B and 3C.

FIG. 2 is a block diagram of the model 3070C RF transponder 200 (compare 102), illustrating the major functional components thereof. This exemplary system is described as an embodiment which preferably measures pressure and temperature, but it is within the scope of the invention to include measurement of other parameters which employ suitable sensors.

The transponder 200 is preferably implemented on a single integrated circuit (IC) chip shown within the dashed line 202, to which are connected a number of external components. Other dashed lines in the figure indicate major functional "blocks" of the transponder 200, and include a transponder "core" 204 and a sensor interface 206. The components external to the IC chip 202 include an antenna system 210 comprising an antenna 212 and typically a capacitor 214 connected across the antenna 212 to form an L-C resonant tank circuit, an external precision resistor (Rext) 216, an external pressure-sensing capacitor ($C_P$) 218, and an optional external maximum temperature measurement switch (MTMS) 220. The antenna 212 may be in the form of a coil antenna, a loop antenna, a dipole antenna, and the like. Alternatively, the signal output by the transponder may be provided on a transmission line. For some of these antenna embodiments (e.g., a loop antenna), the capacitor 214 may be omitted since it would not be of benefit in tuning such an antenna system. In the main hereinafter, a transponder having a coil antenna is described.

The pressure-sensing capacitor $C_P$ is preferably a rugged, low temperature coefficient, sensor with a capacitance versus pressure response having good sensitivity and linearity in the pressure range of interest. An example is an all-silicon "touch mode" capacitive pressure sensor such as are known in the art, and mentioned hereinabove.

The transponder core 204 includes interface circuitry 222 for processing an RF signal, such as a 125 kHz (kiloHertz) un-modulated carrier signal received by the antenna 212, for rectifying the received RF signal, and for providing voltages for powering other circuits on the IC chip 202. For example, the interface circuitry provides a regulated supply voltage (Vdd) of 2.5 volts, and a temperature-independent bandgap voltage (Vbg) of 1.32 volts. The provision of various supply and reference voltages for the transponder circuitry are described in greater detail hereinbelow, with reference to FIG. 3B. The interface circuitry 222 also provides the received RF signal, preferably at the input frequency (Fi) it is received, to a clock generator circuit 224 which generates clock signals in a known manner for controlling the timing of other circuits on the IC chip 202, as well as the output frequency (Fc) of a signal which is transmitted by the transponder 200 to the external reader/interrogator (e.g., 106).

A timing generator/sequencer circuit 226 receives the clock pulses from the clock generator circuit 224 and processes (e.g., divides) the clock pulses to generate timing windows ($W_T$ and $W_P$, described hereinbelow) for predetermined periods of time ($t_T$ and $t_P$, respectively) during which parameter (e.g., temperature and pressure) measurements are made. The timing windows $W_T$ and $W_P$ may either be of substantially equal duration or of unequal duration. The timing generator/sequencer circuit 226 also controls the timing and sequence of various functions (e.g., pressure measurement and capture, temperature measurement and capture, described in greater detail hereinbelow) performed in the sensor interface 206, and is preferably implemented as an algorithmic state machine (ASM).

The transponder core 204 further includes a register/counter circuit 230 which includes a temperature register 232 (e.g., 12-bit) and a pressure register 234 (e.g., 12-bit) for capturing and storing temperature and pressure measurements (counts), respectively, and a block 236 of addressable memory (e.g., 120-bit), which includes an EEPROM array.

The registers 232 and 234 and EEPROM array 236 are shown in a dashed line 238 representing a block of addressable memory on the IC chip 202.

The register/counter circuit 230 also includes a multiplexer and column decoder 240, as well as a row decoder 242 for controlling the sequence in which signals (i.e., data) are output on a line 244 to a modulation circuit 246 which, via the interface circuitry 222, communicates selected measured tire operating characteristics in a data stream via the antenna system 210 to an external reader/interrogator (e.g., 106).

The transponder core 204 also includes a baud rate generator 248 which controls the rate at which modulating information (e.g., the temperature or pressure measurement) is applied to the modulation circuit 246. The baud rate generator 248 also provides a data carrier clock controlling the output frequency Fc of the transponder and a data rate clock controlling a rate at which the data stream including measurements, calibration information, identification, etc. is modulated onto the transponder 200 output carrier signal.

The sensor interface 206 includes a circuit 250 for generating an output current I(T)/N on a line 251 which is related to a predictable characteristic voltage of a temperature-sensitive component (e.g., Vbe of a transistor Q1, described hereinbelow) which is superimposed on the external resistor (Rext) 216. The output current I(T)/N on the line 251 is provided to a relaxation oscillator 252. In general terms, the relaxation oscillator 252 oscillates at a frequency controlled by a rate of voltage change (dV/dT) which is a function of the output current I(T)/N on line 251 and of internal capacitances $C_{FX1}$, $C_{FX2}$ associated with the relaxation oscillator 252 as well as an external capacitance ($C_P$) 218 that can be switched into the oscillator circuit. An output signal Fosc' from the relaxation oscillator 252 is provided on a line 253 which, as will be explained in greater detail hereinbelow, is indicative of both ambient temperature and ambient pressure. As used herein, the term "ambient" refers to the parameter being measured in the vicinity of the transponder 200, or more particularly in the vicinity of the respective sensors associated with the transponder 200. When the transponder 200, 102 is mounted within a pneumatic tire (e.g., 104), "ambient pressure" and "ambient temperature" refer to the pressure and temperature of the inflation medium (e.g., air) within the tire 104.

In operation, an RF signal from an external source (i.e., reader/interrogator, not shown, compare 106) is received by the antenna 212. This RF signal is rectified and used to power the RF transponder 200. Modulating information applied to the modulation circuit 246 is used to alter characteristics of the antenna system 210 (e.g., impedance, resonant frequency, etc.). These alterations are sensed by the external reader/interrogator 106 and are decoded, providing communication of temperature and pressure information back from the RF transponder 200 to the external reader/interrogator 106.

The timing generator/sequencer circuit 226 controls when the external pressure-sensing capacitance ($C_P$) 218 is included in the generation of a signal at frequency Fosc' which is output by the relaxation oscillator 252, and also controls the capturing of the pressure and temperature counts via the data capture circuit 254. For example, to measure temperature, the temperature-sensitive current I(T) passes through the internal oscillator capacitors ($C_{FX1}$ and $C_{FX2}$), but the pressure-sensing capacitor ($C_P$) 218 is disconnected from (not included in) those capacitances. This means that the frequency Fosc' of the oscillator output signal seen on line 253 is a function of temperature alone. When the pressure-sensing capacitor ($C_P$) 218 is "switched in", then the output frequency Fosc' of the oscillator 252 on the line 253 will, as explained in greater detail hereinbelow, be a function of both pressure and temperature. As described in greater detail hereinbelow, an algorithm is employed in the reader/interrogator 106 to extract a "pressure-only" reading from the pressure-temperature measurement.

It should be noted that references made herein to "pressure readings", "pressure counts", pressure response, "pressure register" and the like generally refer to "pressure" as measured by this transponder technique which actually produces a hybrid pressure-temperature reading. When this hybrid reading has been processed to remove its temperature component, the reading will be referred to as a "pressure-only" reading.

As controlled by the timing generator/sequencer circuit 226, the data capture circuit 254 directs the relaxation oscillator output signal Fosc' either to the temperature register 232 via line 255 or to the pressure register 234 via line 257, depending upon whether temperature or pressure is being measured. Counters convert the oscillator frequency Fosc' into counts which are stored in the registers 232, 234. The timing "window" provided by the timing generator/sequencer circuit 226 has a known, controlled duration. As a result, the count remaining in (captured by) the respective temperature or pressure register (232, 234 respectively) when the timing window "closes" is a function of (proportional to) the oscillation frequency Fosc' of the relaxation oscillator 252, and therefore a function of temperature or pressure, whichever is being measured during that timing window.

The EEPROM array 236 is used to hold calibration constants that the reader/interrogator (e.g., 106) uses to convert temperature and pressure counts ($N_T$ and $N_P$, respectively, described in greater detail hereinbelow) into temperature and pressure readings which can be displayed (e.g., via display 112) to a user. The EEPROM array 236 can also store the ID of the transponder, calibration data for the transponder, and other data particular to the given transponder.

FIG. 3 is a more-detailed schematic diagram 300 of several of the components of the transponder 200 of FIG. 2, primarily those components described hereinabove with respect to the sensor interface section 206 of FIG. 2.

In this schematic diagram 300, conventional circuit symbols are employed. For example, lines which cross over one another are not connected to one another, unless there is a "dot" at their junction (cross-over), in which case the lines are connected with one another. Conventional symbols are employed for transistors, diodes, ground connections, resistors, capacitors, switches, comparators, inverters, and logic gates (e.g., "AND", "NAND", "OR", "NOR").

The circuit is described in terms of a CMOS embodiment, wherein "P" followed by a number (e.g., "P1") indicates a PMOS (P-channel) transistor and "N" followed by a number (e.g., "N1") indicates an NMOS(N-channel) transistor. CMOS transistors are of the FET (field effect transistor) type, each having three "nodes" or "terminals"—namely, a "source" (S), a "drain" (D), and a "gate" (G) controlling the flow of current between the source and the drain. In the description that follows, it will be evident that a number of the PMOS and NMOS transistors are "diode-connected", meaning that their drain (D) is connected to their gate (G). The general theory of operation of transistors, particularly CMOS transistors, is well-known to those having ordinary skill in the art to which the present invention most nearly pertains.

As will be evident from the description that follows, a number of the CMOS transistors are connected in a "current-mirroring" configuration. The concept of current-mirroring is well known, and in its simplest form comprises two similar polarity transistors (e.g., two PMOS transistors) having their gates connected with one another, and one of the pair of transistors being diode-connected. Current-mirroring generally involves causing a current to flow through the diode-connected transistor, which results in a gate voltage on the diode-connected transistor required to produce that current. Generally, the gate voltage of the diode-connected transistor is forced to become whatever voltage is necessary to produce the mirrored current through that transistor. Since the diode-connected transistor, by definition, has no gate current, by applying the gate voltage of the diode-connected transistor to any other identically-connected transistor, a mirrored-current will flow through the identically-connected transistor. Typically, the current-mirroring transistors all have the same physical area, in which case the mirrored current will be essentially the same as the current which is being mirrored. It is also known to produce a mirrored current which is either greater than or less than the current being mirrored by making one of the transistors physically larger or smaller (in area) than the other. When such identically-connected transistors having different areas are connected in a current-mirroring configuration, their scaled (larger or smaller) areas will produce correspondingly scaled (larger or smaller) currents.

In the main hereinafter, the numerous connections between the various components of the circuit are clearly illustrated in the figure, and the descriptive emphasis is on the various functions of and interactions between the various components of the circuit rather than on reciting (ad nauseam) each and every individual connection between the various components, all of which are explicitly illustrated in the figure.

The antenna system 210 comprises a coil antenna 212 and an optional capacitor 214 (connected across the antenna 212 to form an L-C resonant tank circuit) providing an alternating current (AC) output to a full-wave rectifier circuit 302.

The full-wave rectifier circuit 302 (compare 222) comprises two PMOS transistors and two diodes, connected in a conventional manner, as shown, and outputs a full wave rectified direct current (DC) voltage on a line 303. A capacitor 304 is connected between the line 303 and ground to "smooth out" (filter) variations ("ripple") in the full wave rectified DC voltage on the line 303. The voltage on the line 303 thus becomes a usable voltage for the remaining components of the transponder—in this case, a positive supply voltage Vcc on the line 303.

A temperature-sensing circuit 306, corresponding approximately to the base-emitter voltage-to-current converter 250 of FIG. 2, is connected between the line 303 (Vcc) and ground, and includes four CMOS transistors labeled P1, P2, N1 and N2 and a lateral bipolar transistor labeled Q1, and is connected to the external resistor 216 (Rext). The transistors P2 and N1 are diode-connected, as illustrated. The two transistors P1 and P2 are connected in a current-mirroring configuration, and the two transistors N1 and N2 are also connected in what can generally be considered to be a current-mirroring configuration. The source (S) of the transistor N1 is connected via the transistor Q1 to ground, and the source of the transistor N2 is connected via the external resistor (Rext) 216 to ground.

As will become evident, the ability of the temperature-sensing circuit 306 to produce a signal (i.e., a current) that is proportional to a sensed ambient temperature (e.g., within the tire with which the transponder is associated) is largely dependent on the characteristic that the base-emitter voltage of the transistor Q1 is a highly predictable and repeatable function of temperature. The resistor (Rext) 216 is an external, precision, reference resistor, whose value is substantially independent of temperature (as contrasted with the temperature dependency of the transistor Q1). A suitable value for the resistor (Rext) 216 is, for example, 20.5 kilohms or 455 kilohms.

The transistor N2 is connected between the transistor P2 and the external resistor 216 (Rext) in a "source-follower" mode. As a voltage is impressed on the gate (G) of the transistor N2, its source voltage will "follow" its gate voltage (minus an inherent voltage drop (Vgs) between its gate and its source).

As current flows through the transistor N1, its gate voltage will be offset by its gate-source voltage drop (Vgs) above the emitter voltage at the transistor Q1. Since the transistors N1 and N2 are essentially identical, with the same current flowing through each of the two transistors N1 and N2, they will have identical gate-source voltage drops (Vgs). As a result, the voltage at the source of the transistor N2 across the external resistor 216 (Rext) will be essentially identical to the voltage at the emitter of the transistor Q1. Hence, applying Ohm's law (E=IR, or I=E/R), the current through the external resistor 216 (Rext) will equal the emitter voltage of the transistor Q1 divided by the resistance of the external resistor 216 (Rext).

In normal operation, all of the current flowing through the external resistor (Rext) 216 flows through the source of the transistor N2 and, consequently, through the diode-connected transistor P2. By a current-mirroring connection, the current through the transistor P2 is replicated (mirrored) in the transistor P1. This ensures that the current flowing through the transistors N1 and N2 will be the same, at all times, which further helps to ensure that the emitter voltage at the transistor Q1 and the voltage across the external resistor (Rext) 216 are identical, independent of voltage and process variations. As mentioned hereinabove, the transistors N1 and N2 are connected in what can generally be considered to be a current-mirroring configuration. However, since they are not strictly identically connected, their function in the circuit 306 is principally for "matching" Q1 and Rext.

In essence, the circuit 306 ensures that the current I(T) flowing through the external resistor (Rext) is predictable, and is a function of the absolute temperature (T) of the transistor Q1. As described in greater detail hereinbelow, this temperature-dependent current I(T) flowing through the external resistor (Rext) 216 is mirrored to a relaxation oscillator (312, described hereinbelow) to provide a signal indicative of the temperature of the transistor Q1 to the external reader (106, FIG. 1). As described in greater detail hereinbelow, the output frequency Fosc' of the relaxation oscillator 312 will be a function of the absolute temperature (T) of the transistor Q1.

At this point, it is useful to note that it is essentially the transistor Q1 that is being employed as the temperature-sensing element of the overall transponder circuit. The transponder circuit advantageously employs an inherent characteristic of such a transistor implemented in CMOS technology that the base-emitter voltage of the transistor Q1 will vary by a predictable amount of −2.2 mv/° C. (millivolts per degree Celsius).

It should be noted that the transponder of the present invention is described in terms of a "passive" device, relying on RF energy being supplied to it by an external source (106, FIG. 1) to power up its circuitry. However, it is within the scope of this invention that the transponder contains its own power supply, such as in the form of a battery. In either case, when first powering up circuitry such as described with respect to the temperature-sensing circuit 306, it is important to ensure that they "ramp up" to their normal operating state from their quiescent state in a reliable and predictable (controlled) manner. To this end, two lines 305 and 307 are illustrated which are connected between the temperature-sensing circuit 306 and a "startup" circuit 308.

The startup circuit 308 (also part of the base-emitter voltage-to-current converter 250 of FIG. 2) is connected between the supply voltage (Vcc) on the line 303 and ground, and serves two main purposes: (i) to get current flowing in the temperature-sensing circuit 306 when the transponder (200) first starts up from a powered down state; and (ii) to mirror and convert the current flowing through the transistor P2 from a supply-referenced current to a ground-referenced current.

Startup is initiated by the transistor P3. The transistor P3 is fabricated to have high channel resistance so as to function in a "weak pull-up" mode. With its gate connected to ground, it will always be "on", and will behave essentially like a resistor having a high resistance (e.g., >1 mega-ohm).

Since, at startup, no current flows elsewhere in the circuit, the transistor P3 operates to pull the gate of the transistor N3 towards the supply voltage (Vcc), thereby turning the transistor N3 "on", which effectively connects the grounded source of transistor N3 to its drain (D) which, in turn, grounds the gates of transistors P1, P2, and P4, and also grounds the drain of diode-connected transistor P2. This causes current to flow through the transistor P2 of the temperature-sensing circuit 306 into the drain of the transistor N3. Since the transistors P1, P2 and P4 are current-mirror connected (via the "Pbias" line 305), the current now flowing through transistor P2 will be mirrored in the transistors P1 and P4. As current flows through the transistor P4 into the diode-connected transistor N5, a current-mirroring connection between the transistors N4 and N5 causes a corresponding current to flow through the transistor N4, thereby pulling the gate of transistor N3 to ground, thereby effectively shutting "off" the flow of current through the transistor N3.

However, with current now flowing through the current-mirrored transistors P1, P2 and P4, current flowing from the transistor P1 through the diode-connected transistor N1 into the transistor Q1 forces the temperature-sensing circuit 306 to "start up" in its stable operating point state (rather than its zero current state). After startup, the transistor N3 essentially "drops out" of the circuit, having performed its intended function.

The transistor N5 is connected in a current-mirroring configuration with the transistor N4 (and, as described hereinbelow, with the transistor N6). Therefore, essentially, with a current equivalent to the current through the external resistor (Rext) 216 flowing through the transistor N5, the same current flows through the transistor N4, thereby establishing a reference voltage (Nbias) on the line 309. The reference voltage (Nbias) on the line 309, as well as a supply voltage (Vdd) on a line 309', are provided to a current scaling circuit 310.

The supply voltage (Vdd) on the line 309' is provided in any suitable manner, such as a multiple of a bandgap voltage (Vbg) generated in a conventional manner elsewhere on the chip, and its magnitude (e.g., 1.32 volts) should be independent of temperature, such as inherent to the silicon process which is employed in making the chip. The provision of such a stable (e.g., bandgap) voltage (e.g., Vbg) and the supply voltage (e.g., Vdd) derived therefrom is well within the purview of one having ordinary skill in the art to which the present invention most nearly pertains, and is described in greater detail hereinbelow with respect to FIG. 3B.

The current scaling circuit 310 (also part of the base-emitter voltage-to-current converter 250 of FIG. 2) is constructed in the following exemplary manner. The sources of the transistors P5 and P6 are connected to supply voltage Vdd. The gate of a transistor N6 receives the reference voltage (Nbias) on the line 309. The transistor N6 is connected in a current-mirroring configuration with the transistor N5 (as well as with the aforementioned transistor N4) and will therefore mirror the flow of current I(T) through the transistors N4 and N5. Consequently, the flow of current through the diode-connected transistor P5 will mirror the flow of current through the transistors N4, N5 and N6.

The transistors P5 and P6 are connected in a current-mirroring configuration, but are fabricated (using conventional CMOS fabrication techniques) such that current flowing through the transistor P6 is scaled up or down by a ratio (N) of the physical area of the transistor P5 to the physical area of the transistor P6. For example, if the transistor P6 is smaller in size than the transistor P5 (i.e., the transistor P5 is "N" times larger in area than the transistor P6), then the current flowing through the transistor P6 will be commensurately (N times) smaller than the current flowing through the transistor P5. Thus, the "scaled" current flowing through the transistor P6, is labeled "I(T)/N" in the figure, and is provided on a line 311 (compare 251) to a relaxation oscillator circuit 312 (compare 252). It is well known that the ratio of the currents between the transistors P5 and P6 can readily be established by conventional circuit processing techniques, such as by simply making one of the transistors larger than the other, or by implementing a one of the two transistors as the aggregate of two or more same-size transistors so that their aggregate area is larger than the area of the other of the two transistors.

The relaxation oscillator circuit 312 (compare 252) is of fairly conventional design, and includes a measurement switching circuit 315 at the "front end" of a set-reset circuit 314 comprising two phase paths 314a, 314b. This circuit 315 comprises a pair of complementary transistors P7 and N7 connected to a charged side of a measurement capacitor $C_{FX1}$ at the front end of a one phase path (φ1) 314a; and another pair of complementary transistors P8 and N8 connected to a charged side of another measurement capacitor $C_{FX2}$, plus a switch 350 to add another measurement capacitor $C_P$, all at the front end of another phase path (φ2) 314b.

Connected as illustrated, for a given pair of transistors (e.g., P7 and N7), when their common gate voltage is high (i.e., towards positive supply) their output (e.g., to phase path 314a) will be grounded (connected to ground and isolated from current I(T)/N on line 311), and when their common gate voltage is low, their output will provide the current I(T)/N flowing on the line 311 to a respective one of the phase paths (e.g., 314a) of the relaxation oscillator 312. As is known for circuitry such as the relaxation oscillator 312, when the common gate voltage of a one of the pairs of transistors (e.g., P7 and N7) is high, the common gate voltage of the other of the pairs of transistors (e.g., P8 and N8) will be low, and vice-versa. In this manner, each phase path 314a and 314b has a duty cycle (i.e., its "on" time), which may be the same as or may be different than the duty cycle of the other phase path 314b and 314a, respectively.

Thus, each pair of transistors (e.g., P7 and N7) may be considered to be an "input switch" to its respective phase path (e.g., 314a).

Each phase path 314a and 314b of the relaxation oscillator 312 has a comparator 316a and 316b, respectively, at its input, and has a fixed-value capacitor $C_{FX1}$ and $C_{FX2}$, respectively, connected between the negative (−) input of the comparators 316a and 316b and ground. The capacitors $C_{FX1}$ and $C_{FX2}$ have exemplary capacitance values of 2–5 pf (picofarads) and 2-5 pf, respectively, and are preferably implemented as equal-valued "on-chip" devices, such as poly-to-poly capacitors exhibiting a low temperature coefficient (e.g., less than 20 ppm). The positive (+) inputs (terminals) of the comparators 316a and 316b are tied together and are set to a reference threshold voltage Vbg, such as 1.32 volts, which is independent of temperature.

A "NOR" logic gate 318a and 318b is connected at the output of each phase path 314a and 314b, respectively, and the two NOR gates 318a and 318b are cross-connected to form a latching circuit having an output on a line 319a and 319b. The cross-connected NOR gates 318a and 318b are thus capable of functioning as a flip flop, or an RS (re-set/set) latch.

When the common gate voltage of one of the input switches (e.g., P7 and N7) is high, the respective capacitor (e.g., $C_{FX1}$) for that phase path (e.g., 314a) is grounded (shorted out, caused to be devoid of charge). Conversely, when the common gate voltage of one of the input switches (e.g., P7 and N7) is low, the scaled current I(T)/N from line 311 is applied to (allowed to flow into) the respective capacitor (e.g., $C_{FX1}$) for that phase path (e.g., 314a), and the capacitor begins to charge (acquire an increasing voltage across the capacitor). When the voltage across the capacitor $C_{FX1}/C_{FX2}$ reaches the comparator reference voltage Vbg the output of the comparator 316a/316b goes low and changes the state of the output of the latch 318a/318b on the line 319a/319b. In this manner, the relaxation oscillator 312 will oscillate at a frequency Fosc determined by the rise time of the capacitors $C_{FX1}$ and $C_{FX2}$ and, importantly, by the scaled current I(T)/N being supplied to the capacitors $C_{FX1}$ and $C_{FX2}$. With greater current I(T)/N being supplied, the voltages of the capacitors $C_{FX1}$ and $C_{FX2}$ will rise faster, crossing the threshold voltage faster, and causing the relaxation oscillator 312 to oscillate faster, thereby increasing the frequency Fosc of the signal on the line 319a. The signal on the line 319a is inverted by an inverter 320, as shown, to provide a signal of frequency Fosc' on the line 321.

As described in greater detail hereinbelow, the oscillator 312 is controlled to run in two mutually-exclusive modes, a temperature-sensing mode (between times t0 and t1) and a pressure-sensing mode (between times t1 and t2), as controlled by the timing generator/sequencer 226. The frequency of the oscillator output signal Fosc (and Fosc') will be different in each of these two modes.

Generating Temperature and Pressure Readings

In the exemplary context of the transponder 200 being associated with a pneumatic tire, it is principally desirable to determine the pressure within the pneumatic tire. For example, a typical passenger vehicle tire may be properly inflated at about 32 psi (about 221 kPa). Since tire inflation pressures are normally specified as "cold" pressures (pressure measured when the tire is not heated by operation), and since a monitoring device will be reporting pressures measured in tires which are most likely in use and therefore "hot", it is secondarily desirable to determine the temperature of the inflation medium (e.g., air) within the pneumatic tire. Utilizing the temperature measurement, a monitoring system (e.g., 106) can, for example, convert the measured pressure to a "cold" pressure with simple calculations based on the ideal gas law (PV=$\mu$RT). This "cold" pressure could be considered a "temperature-independent" pressure, which is also an indication of the mass of air contained by the tire. With reference to the transponder 200, the hybrid "pressure" measurement it produces must be converted (by different calculations detailed hereinbelow) to a true pressure-only measurement before it can be used in such gas-law calculations.

It is, for example, estimated that an approximate 10% decrease in fuel consumption could be realized if the pneumatic tires on vehicles were operated at their specified pressure. Although vehicle fleet operators are typically sensitive to this issue, and check and adjust tire pressure frequently, the average operator of a passenger vehicle is often less inclined to keep an eye on their tire pressure until, for example, the tire is visibly flattened out. In such cases, an LCD (liquid crystal display) readout or the like on the dashboard of a car could provide dynamic tire inflation information to the operator of a vehicle, the pneumatic tires of which are equipped with a transponder such as the one described herein. Of no less significance is the emergence of "run-flat" tires being marketed by various tire manufacturers. The Goodyear EMT (extended mobility technology) series of tires is an example of a "run-flat" tire, an overall purpose of which is to allow a driver to travel up to 50 miles (approximately 120 kilometers) on a deflated ("flat") tire, at "reasonable" operating speeds (e.g., 60 miles per hour, or 144 kilometers per hour), while maintaining normal control over the vehicle. Such run-flat tires are generally well known, and do not form a portion of the present invention, per se. When running "flat" on a run-flat tire, it is particularly important that the driver be alerted to the fact that he or she is operating the vehicle on "borrowed time" as indicated, principally, by an indication, whether visual or audio (e.g., a beep) that the tire is indeed "flat" and needs to be repaired or replaced at his or her earliest convenience (and before the run-flat mileage limit).

By allowing the relaxation oscillator 312 to run, the frequency of its output signal Fosc (and Fosc') will be a function of the absolute temperature of (sensed by) the transistor Q1. This is true in both the temperature-sensing mode and the pressure-sensing mode of operation.

In the temperature-sensing mode, and in the case that the capacitance values for $C_{FX1}$ and $C_{FX2}$ are equal, which is preferred, the relaxation oscillator 312 will have a symmetrical (balanced, 50%) duty cycle. In the pressure-sensing mode, the pressure-sensing capacitor ($C_P$) 218 is switched by a semiconductor switch 350 across $C_{FX2}$, which changes the duty cycle and output frequency Fosc (and Fosc') of the relaxation oscillator 312.

In the temperature-sensing mode, only the fixed capacitors $C_{FX1}$ and $C_{FX2}$ are being alternately charged (and discharged) resulting in a 50% duty cycle with a period proportional to ambient temperature. In the pressure-sensing mode, the pressure-sensing capacitor ($C_P$) 218 is switched into phase path 314b of the oscillator 312. Thus, for a given temperature, for the first half of the oscillator period the phase path 314a behaves in the same manner as in the temperature-sensing mode, and for the second half of the oscillator period the phase path 314b behaves in a manner that is proportional to the capacitance value of the fixed capacitor $C_{FX2}$ plus the capacitance value of the pressure-sensing capacitor ($C_P$) 218. This, in effect, slows down the oscillator and changes its duty cycle. The change in the duty cycle is indicative of the ratio of $C_P$ to $C_{FX2}$. Thus, from the ratio of the two periods (with and without $C_P$ in the circuit, it is straightforward to calculate what the additional capacitance $C_P$ is, hence the sensed pressure. As described in greater detail hereinbelow, the temperature-dependency of the oscillator output in the pressure-sensing mode can be completely eliminated, in a straightforward manner.

The "slowing down" of the oscillator when the pressure-sensing capacitor ($C_P$) 218 is switched into the oscillator circuit results, inevitably, in there being relatively fewer oscillator output pulses (reduced output frequency) to count during a given pressure-measurement window (e.g., $W_P$) than during a similar duration temperature-measurement window (e.g., $W_T$). In other words, a "slowed-down" oscillator will reduce that rate at which counts indicative of the parameter measurement are collected. In order to increase the resolution (quantity) of the counts ($N_P$) generated during the pressure-measurement window ($W_P$), it is contemplated that the pressure-measurement window ($W_P$) can be increased in size (changed in duration) so as to allow for the capture of an appropriate number of pressure counts in the pressure register 234. This can readily be accomplished simply by establishing a larger (than otherwise) value for the time t2 which establishes the end of the pressure-measurement window ($W_P$) in the pressure-sensing mode (between times t1 and t2), as controlled by the timing generator/sequencer 226. For example, the temperature-measurement window $W_T$ (between times t0 and t1) can be on the order of several ones (e.g., eight) of milliseconds, and the pressure-measurement window $W_P$ can be on the order of tens or dozens (e.g., eighty) of milliseconds. Alternatively, it is contemplated that the scaled current (I(T)/N) flowing out of the current scaling circuit 310 to the relaxation oscillator 312 could be increased during the pressure-measurement window ($W_P$) to increase the fundamental frequency of the relaxation oscillator 312, thereby increasing the overall resolution of the pressure count. This can readily be accomplished, for example in the case of transistor P6 being smaller in size (area) than the transistor P5, simply by switching in a transistor P6' (not shown) in lieu of the transistor P6, the transistor P6' having a larger area than the transistor P6 so that the ratio of the areas of the transistors P5 and P6 is closer to unity (i.e., less scaled down) and the current to the relaxation oscillator 312, hence its counting rate, is increased. Such switching in of another transistor P6' is readily effected with a switch (not shown) comparable to the aforementioned switch 350 which switches in the pressure-sensing capacitor ($C_P$) 218. One having ordinary skill in the art to which the present invention most nearly pertains will readily understand how to offset the "slowing down" of the oscillator when the pressure-sensing capacitor ($C_P$) 218 is switched into the oscillator circuit, in light of the teachings presented herein.

Optimizing Pressure-Responsiveness

Obtaining (and displaying) an accurate pressure reading being of paramount importance when monitoring the pressure of a pneumatic tire, certain parameters of the transponder circuit may be established to maximize its pressure-responsiveness and therefore improve the accuracy of the pressure reading displayed by the external reader/interrogator (e.g., 106).

As described hereinabove, the transponder responds to the changing capacitance of the pressure sensor ($C_P$) 218 by changing the value of a binary 12-bit word that is transmitted to the external reader/interrogator 106. This binary word is the count of an oscillator frequency during a timing window $W_P$ (between t1 and t2) established by the timing generator/sequencer 226. The pressure response can therefore be described as the change in counts per unit change in capacitance of the pressure-sensing capacitor ($C_P$) 218.

Pressure-responsiveness (and resolution) of the transponder has been found to be dependent on a number of factors, each of which can be analyzed. For example, it has been determined that:

(a) Increasing the pressure-measurement window $W_P$ to make it larger than the temperature-measurement window $W_1$ will increase the pressure count $N_P$ (and not the temperature count $N_T$) for a given value of the pressure-sensing capacitor ($C_P$) 218, to make up for the relatively lower oscillator frequency which occurs during pressure measurement compared to temperature measurement (as detailed hereinabove).

(b) Increasing the scaled current I(T)/N to the oscillator 312 will proportionally increase the pressure count $N_P$ for a given value of the pressure-sensing capacitor ($C_P$) 218.

(C) Decreasing the values for capacitor(s) $C_{FX1}$ and/or $C_{FX2}$ will proportionally increase the pressure count $N_P$ for a given value of the pressure-sensing capacitor ($C_P$) 218.

(d) Increasing the scaled current I(T)/N to the oscillator will proportionally increase the pressure count $N_P$ (for a given value of $C_P$) at a greater rate than decreasing the values for capacitors $C_{FX1}$ and $C_{FX2}$.

(e) Increasing the scaled current I(T)/N will increase both the pressure counts $N_P$ and the temperature counts $N_T$ unless the current increase can be made to occur only during the pressure-measurement window $W_P$.

(f) Decreasing the values for capacitor(s) $C_{FX1}$ and/or $C_{FX2}$ will increase both the pressure counts $N_P$ and the temperature counts $N_T$ even if only one of the capacitors is changed.

As a general proposition, increasing the pressure counts $N_P$ is desirable. However, one having ordinary skill in the art to which the present invention most nearly pertains will readily appreciate that there is a practical upper limit to increasing the pressure counts at a frequency which may become unacceptably large for the capability of certain circuits of the IC chip.

Measuring Parameters

FIG. 3A illustrates the components involved in the final step of capturing temperature and pressure measurements in the transponder. The signal Fosc' output by the relaxation oscillator 312 is provided on line 321 (compare 253) to an input of each of two AND gates 360 and 362 in the data capture circuit 254. A signal ("Capture Temp") is provided by the timing generator/sequencer 226 to the other input of the AND gate 360 during the temperature-sensing window ($W_T$) so as to load the temperature register 232 via line 255 with the count ("data," or "reading") $N_T$ indicative of measured temperature. Another data signal ("Capture Press") is provided by the timing generator/sequencer 226 to the other input of the AND gate 362 during the pressure-sensing window ($W_P$) so as to load the pressure register 234 with the count ("data," or "reading") $N_P$ indicative of measured pressure. Each of the registers 232, 234 has a counter (not shown) associated with it to convert the incoming oscillating signal Fosc' to a stored count. The two counts $N_T$, $N_P$ are then shifted out of the registers 232 and 234, via the MUX 240, to the modulation circuit 246 described hereinabove.

When the transponder is powered up, temperature and pressure are continuously measured, and these measurements are transmitted back to the external reader/interrogator 106 as data words in a data stream. For example, each of the temperature and pressure parameters can be transmitted back to the reader/interrogator 106 as 12-bit data words in selected (known) portions of a larger (e.g., 144-bit) data stream. One bit in the overall data stream may be dedicated to the state (e.g., "closed" or "open") of the MTMS switch 220. A complete description of an exemplary data stream being transmitted by the transponder to the external reader/interrogator is set forth hereinbelow with reference to FIG. 3C.

Temperature is suitably measured by counting the number of cycles output from the oscillator 312 during a fixed time period (window $W_T$ of time from t0 to t1) having a time period $t_T$. For example, a down-counter (not shown, but associated with the temperature register 232) may be clocked by the oscillator, such that at the end of the window $W_T$ time period $t_T$, a temperature count $N_T$ is generated. The relationship between temperature count $N_T$ and temperature is substantially linear for the circuitry 300 of this embodiment.

Similarly, pressure can be measured by counting the number of cycles output from the oscillator 312 during a fixed time period (window $W_P$ of time from t1 to t2) having a time period $t_P$. For example, a down-counter (not shown, but associated with the pressure register 234) may be clocked by the oscillator, such that at the end of the window $W_P$ time period $t_P$, a temperature count $N_P$ is generated. The relationship between pressure count $N_P$ and pressure is a predictable function of both actual pressure and temperature for the circuitry 300 of this embodiment. As explained hereinbelow, by manipulating the temperature and "pressure" counts ($N_T$ and $N_P$) this hybrid pressure-temperature value can be used to determine a pressure-only value.

Obtaining a Pressure-Only Reading at the Reader/Interrogator

The fundamental frequency of the oscillator 312 is set by parameters in the IC chip (e.g., 202) and, as described hereinabove, is temperature-dependent. Therefore, the pressure response $N_P$ is a function (hybrid) of both temperature and pressure, and the relationship of $N_P$ to $C_P$ is nonlinear. Therefore, using a linear equation for calculating the pressure response would inevitably lead to significant errors over a range of pressures being measured. However, for limited ranges of pressures being measured, for example over a 20 psi (138 kPa) range of pressures, using a linear equation may be acceptable. A better approximation might be obtained using a polynomial equation, but this would complicate the reader/interrogator logic, making for slower response, and would require additional calibration constants.

An important advantage of using the transponder circuitry described hereinabove is that the relationship of $N_T/N_P$ to pressure sensor capacitance $C_P$ is linear, and requires no temperature compensation term in the equation (algorithm) used by the reader/interrogator 106 to calculate pressure, thereby greatly simplifying the design of the reader/interrogator. (This also assumes the use of a pressure sensor ($C_P$) 218 which has a substantially linear relationship between pressure and capacitance.) This beneficial "ratiometric" relationship is readily demonstrated by the following equations:

Generally, count=counting window time (t)*frequency (F)

F=1/period

Charging time=V*C/I for a capacitor with capacitance C to be charged to a voltage V with a current I.

Since the period of the relaxation oscillator 312 with output signal of frequency Fosc' is the sum of the charging times for the capacitances in the two phase paths 314a and 314b, the above equations can be manipulated to obtain a general equation for the count from such a relaxation oscillator with capacitances $C_{FX1}$ and $C_{FX2}$, for example:

$$\text{count}=t/(V^*C_{FX1}/I+V^*C_{FX2}/I)=t^*I/(V^*(C_{FX1}+C_{FX2}))$$

Substituting the values for the temperature and pressure counts:

$$N_T=(t_T^*I(T)/n_T)/(Vbg^*(C_{FX1}+C_{FX2}))$$

$$N_P=(t_P^*I(T)/n_P)/(Vbg^*(C_{FX1}+C_{FX2}+C_P)) \quad [\text{EQ. A}]$$

where $n_T$ and $n_P$ are values for the scaling factor N in the scaled current I(T)/N which could be different during the temperature and pressure measurement windows, respectively.

Dividing equations to obtain $N_T/N_P$:

$$N_T/N_P=(t_T/t_P)^*(n_P/n_T)^*(C_{FX1}+C_{FX2}+C_P)/(C_{FX1}+C_{FX2})$$

or $$N_T/N_P=(t_T/t_P)^*(n_P/n_T)^*(1+(C_P/(C_{FX1}+C_{FX2})) \quad [\text{EQ. B}]$$

Since everything to the right of the equals sign is a defined constant except for the pressure-sensing capacitance $C_P$, it can be seen that there is a linear relationship between $N_T/N_P$ and $C_P$ (and thus pressure). This means that $N_T/N_P$ is only a function of pressure, and is insensitive to temperature or capacitor-charging current variations.

If none of the response optimization steps described hereinabove have been utilized, then the equation EQ. B can be simplified since capacitors $C_{FX1}$ and $C_{FX2}$ have the same value $C_{FX}$; the measurement windows $W_T$ and $W_P$ have the same time width $t_T=t_P=t_W$ (e.g., 8.192 ms); and the current scaling factors $n_T$ and $n_P$ have the same value N:

$$N_T/N_P=1+(C_P/2^*C_{FX})$$

It can be seen from equation EQ. A that there is already a linear relationship between the temperature count $N_T$ and the current I(T) (which is, in turn, proportional to temperature).

In both of the measurement equations EQ. A and EQ. B it can be seen that linear relationships exist, but the slope and intercept of these equations are complex combinations of multiple parameters which are unique to a given transponder design, and are likely to be different even for each transponder of a given design due to manufacturing variances. In a simple embodiment of this invention, the transponder could transmit only the counts $N_T$ and $N_P$ to a reader/interrogator, and the reader/interrogator would have to use assumed average values for slope and intercept in order to determine temperature and pressure. This could cause significant inaccuracy, so the preferred embodiment as described herein stores calibration constants in the transponder memory (e.g., 236) and transmits these calibration constants with the measurement counts $N_T$ and $N_P$ so that the reader/interrogator (e.g., 106) can accurately calculate temperature and pressure using linear equations customized/optimized for the individual transponder generating the measurements. The linear equations used in the exemplary reader/interrogator (e.g., 106) are of a well-known "point-slope" form:

$y-y_1=m(x-x_1)$ where:

$(x_1,y_1)$ is the defining point; and m is the slope.

The slope (m) can be determined from any two points on the line: $(x_1,y_1)$, $(x_2,y_2)$:

$$m=(y_2-y_1)/(x_2-x_1)$$

Substituting for x and y, a specific equation for the temperature response line becomes:

$$N_T-N_{T1}=m_T(T-T_1)$$

Choosing a value such as 25° C. for temperature $T_1$ yields the equation:

$$N_T-N_{T25}=m_T(T-25)$$

Solving for $N_T$ yields the following equation for the temperature response line:

$$N_T=m_T(T-25)+N_{T25}$$

wherein the slope $m_T$ of the temperature response line is:

$$m_T=(N_{T2}-N_{T1})/(T_2-T_1)$$

As long as the reader/interrogator "knows" the assumed defining point temperature (e.g., 25° C.), then it will be able to calculate a temperature (T) from a received value of temperature count $N_T$ using the calibration constants: a defining point temperature count $N_{T25}$ and a slope $m_T$ which are also transmitted to the reader/interrogator. A similar set of equations can be applied to determine pressure from transmitted pressure (and temperature) counts and pressure calibration constants. As noted hereinabove, the pressure-only reading is best determined from a linear equation utilizing a ratio $N_T/N_P$ (temperature count divided by pressure count) instead of just the pressure count $N_P$.

The calibration constants are determined in a calibration process which includes exposing each transponder to a set of controlled, known temperature and pressure conditions and recording the corresponding set of temperature and pressure counts ($N_T$ and $N_P$) generated by that transponder. Calculations on these calibration test results determine four calibration constants which are then stored in the transponder memory (e.g., 236). The four calibration constants are numbers representative of the slope and defining point for a linear response of temperature versus temperature count $N_T$, and pressure (only) versus count ratio $N_T/N_P$.

Generating Reliable Supply and Reference Voltages

As described hereinabove, the positive (+) inputs (terminals) of the comparators 316*a* and 316*b* are tied together and are set to a reference "bandgap" voltage Vbg, such as 1.32 volts, which is independent of temperature. As also mentioned hereinabove, the supply voltage (Vdd) on the line 309' may be provided as a multiple of the reference bandgap voltage (Vbg) so as to be a stable operating voltage for the current scaling circuit 310 and the relaxation oscillator 312.

FIG. 3B illustrates a circuit 370 suitable for generating the supply voltage Vdd. A temperature-independent calculable bandgap voltage Vbg is readily derived, based on the processing techniques employed in fabricating the IC chip, as being inherent to the selected process (e.g., CMOS). This bandgap voltage Vbg is provided to the positive (+) input of an operational amplifier 372, connected as shown, in a feedback loop having gain, to provide supply voltage Vdd as an integral multiple of the bandgap voltage Vbg.

An Exemplary Data Stream

As mentioned hereinabove, information (data) from the transponder is transmitted to the external reader/interrogator in the form of a data stream, a portion of which is the temperature count $N_T$, another portion of which is the pressure count $N_P$, and another portion of which represents the state (e.g., "closed" or "open") of the MTMS switch (220). Remaining portions of the data stream may contain information which is personalized to a given transponder unit such as its ID information (e.g., serial number), calibration constants, and the like.

FIG. 3C illustrates an exemplary architecture for information which is stored in memory (e.g., 238) within the transponder 200, as well as a data stream which is transmitted by the transponder 200 to the external reader/interrogator 106. The memory 238 of the transponder core 204 has, for example, a 144-bit address space which includes 119 (one hundred nineteen) bits of programmable memory and one address location dedicated to the state of the MTMS switch 220—these 120 (one hundred twenty) bits of programmable memory constituting the EEPROM 136—plus two 12-bit temperature and pressure registers 232 and 234, respectively.

Each of the 119 programmable memory bits can separately be written to with any combination of data, including synchronization (sync) pattern information, general data, error checking codes, and temperature and pressure calibration data. The EEPROM is 'block writeable', meaning that in the 'write' mode, the entire 120 bits of EEPROM are programmed to a logical (binary) value of "1". Individual bits can be 'erased' (set to a logical value of "0" simply by clocking the chip to the bit's physical address and placing the chip into the 'erase' mode). The address location is preserved.

In this example, the first twelve data locations (000 . . . 011 in ROW 1) are reserved for sync. The next seventy one data locations (012 . . . 082 in ROWs 2 through 7) are for general information and a value for a data validation algorithm such as CRC (Cyclic Redundancy Check). The next data location (083) contains the logic level (state) of the MTMS switch 220. A logical value of "1" indicates that the MTMS switch is open and a logical value of "0" indicates that the MTMS switch is closed.

As mentioned hereinabove, each transponder unit is suitably calibrated prior to its installation in a tire. The next twelve data locations (084 . . . 095 in ROW 8) hold temperature calibration (e.g., defining point) data ("TEMP COMP"). The next twelve data locations (096 . . . 107 in ROW 9) hold pressure calibration (e.g., defining point) data ("PRESS COMP"). The next twelve data locations (108 . . . 113 and 114 . . . 119 in ROW 10) hold calibration (e.g., slope) information for temperature and pressure, respectively.

As counts $N_T$ and $N_P$ for temperature and pressure are generated, as described hereinabove, they are stored in ROWs 11 and 12 of the overall memory space, which correspond to the temperature and pressure registers 232 and 234, respectively. Various predetermined values can be stored to indicate error conditions such as overflow and short-circuit.

Operating Frequencies and Modulation

The transponder of the present invention is not limited to any particular operating frequency. The choice of operating frequency will depend largely upon factors such as where the transponder is mounted in relationship to the object it is monitoring, the location of the reader/interrogator antenna (108), and relevant government regulations permitting (conversely, restricting) data transmissions of the type set forth herein in selected portions of the overall RF frequency spectrum.

An example of suitable operating frequencies for operating the transponder in the United States is 60 KHz to 490 KHz.

The transponder can be polled (and powered) by the reader/interrogator 106 at a first "interrogation" frequency (Fi), and the data stream can be transmitted back to the reader/interrogator at a second "data carrier" frequency (Fc) which is, conveniently, a whole number multiple or fraction of the interrogating frequency. For example, Fc=Fi/2. Or, Fc=Fi/4. The frequency (Fc) at which the data stream is transmitted back to the reader/interrogator is independent of the data rate, which is established by the clock generator 224 and the baud rate generator 248. However, one having ordinary skill in the art to which the present invention most nearly pertains will recognize that the range of available baud rates will typically be significantly less than the interrogation frequency (Fi). The baud rate is preferably derived from the interrogation frequency (Fi) of the reader/interrogator, such as a whole number fraction thereof. For example, the baud rate may be set at Fi/32 (or, in the case of Fc=Fi/2, the baud rate can be set to Fc/16).

For example, the interrogation frequency (Fi) may be 125 KHz, and the data carrier (Fc) may be set to 62.5 KHz, or half of the interrogation frequency.

In another example, an interrogation frequency (Fi) of 13.56 MHz has been found to be suitable.

The data stream, such as the exemplary data stream described with respect to FIG. 3C is impressed by the modulator circuit 246 onto the antenna 212, and transmitted to the reader/interrogator 106. It is within the scope of this invention that any suitable modulation scheme be employed, including amplitude modulation (AM), frequency modulation (FM), frequency shift keying (FSK), and phase shift keying (PSK). However, phase shift keyed (PSK) is preferred. AM modulation is not particularly well-suited to digital transmission. Frequency modulation schemes such as FM or FSK may be somewhat problematic with regard to propagating the data-modulated transponder output signal through the medium of a pneumatic tire (e.g., 104).

Ratio Versus Signal Strength

An added advantage of using the ratio $N_T/N_P$ for a pressure indicator accrues because it has been determined that the ratioed value is less sensitive to variations in coupling between the reader/interrogator and the transponder than either of the $N_T$ and $N_P$ measurements taken alone. This is illustrated in FIG. 3D which shows a graph 390 of measurement counts (on vertical axis 394) versus power (on horizontal axis 392). For a passive transponder 200 such as described in the preferred embodiment of this invention, the transponder power is supplied by the RF signal from the reader/interrogator (e.g., 106). If the RF coupling strength weakens due to transmission or reception problems including excessive distance or interference, then the power in the transponder 200 circuitry may decrease. It has been determined that for power levels below a certain value $PWR_1$, the relaxation oscillator 312 outputs a lower Man normal frequency signal Fosc' and thus reduces the temperature and pressure counts $N_T$ and $N_P$ below what they should be for a given temperature or pressure. The effect is illustrated by the downward curve on the plot 396 of temperature count $N_T$ and on the plot 398 of pressure count $N_P$ as the plots extend below the minimum power $PWR_1$. Fortuitously, the low-power effect is proportionally the same for both counts, so that the ratio $N_T/N_P$ (plot 399) becomes relatively steady for all power levels down to a minimum power $PWR_0$ needed to operate the transponder 200. Thus, by determining (during calibration) and storing calibration data for the ratioed value of $N_T/N_P$ in the transponder, the ability to determine a pressure-only reading which is relatively insensitive to coupling variations between the reader/interrogator and the transponder is both simplified and made more reliable.

Improvements, Generally

The present invention deals with a new "RFIQ" transponder 400 (see FIG. 4A) which implements improvements to the previous model, "3070C" transponder 200 described hereinabove. A number of improvements have been made, and new features incorporated, including, but not limited to:

Lower power consumption.
Increased oscillator stability vs. Power or Frequency.
Increased resolution of temperature and pressure counts.
Increased electrostatic discharge (ESD) protection to more than 2200V.
Increased, programmable modulation index (magnitude of PSK modulation applied to the RF signal).
Reduced number of external connection pins for programming and testing.
Increased Digital and Analog Testability.
Increased to 192 bits of data stream.
Increased to 156 bits of programmable EEPROM.
Programmable with the antenna (coil) attached.
6 bits of parity—1 bit for each 4 bits of NT, NP data.
Programmably scale currents to independently optimize reading counts for pressure and temperature.
3V Battery powered mode for use in "active" implementations of the transponder ("active tags").
Power-On Reset.
Base-band data output on a test pin.

Problems to be Solved

In particular, there are general problems with the previous transponder design 200 described hereinabove. It is believed that improvements which are the subject of the present invention provide solutions for a number of these problems:

The relaxation oscillator of the previous design transponder 200 could be adjusted to optimize the pressure and temperature counts (NP and NT) for a desired pressure and temperature range, but the adjustment could only be accomplished during integrated circuit production. It is desirable to provide a way to optimize the counts NP and NT after integrated circuit production.

When the previous design transponder 200 is used (as a passive transponder), inaccurate results may be transmitted when the transponder operates at too low a power input, such as during startup, or when distant from the reader/interrogator. (For example, refer to FIG. 3D.) In addition, the previous model would start modulating ("transmitting") as soon as it received an interrogation signal of any strength, and would start the transmission at a random location in the data word. If the initial signal was weak (from a distant reader/interrogator), then the voltage supplies could be insufficient to produce valid temperature and pressure readings. And if modulation started before sufficient power levels were developed, then the power drain of signal modulation would aggravate the insufficient power problems. A further problem occurs if the relaxation oscillator does not start each measurement cycle in a consistent, defined state.

The previous design transponder 200 has a fixed modulation index (magnitude of RF signal modulation) which is determined during integrated circuit production. It is desirable to provide a way to optimize the transponder for different combinations of antenna ("coil") 210 and reader/interrogator 106, and for different operating conditions. Also, certain transponder applications utilize an external zener clamp across the antenna 210 for better stability, but the zener can cause the previous design transponder 200 to be "read-limited".

Although the previous design transponder 200 can have certain operating characteristics adjusted ("trimmed") during manufacture (e.g., current scaling via size adjustments to transistors), these manufacturing changes are permanent, and not easy to vary from transponder to transponder. Furthermore, if trim settings were to be implemented in programmable memory (e.g., EEPROM), then there would be other problems with accessing those settings during power-up, and continuously rather than through row (242) and column (240) decoders.

Other improvements and problem solutions may become evident in the description to follow.

General Description

The improved RFIQ™ transponder 400 (compare 200, 102) is a custom CMOS, low voltage Integrated Circuit ("IC", or "chip") that can measure temperature and pressure as a low-frequency "passive" (RF signal-powered) transponder or as an "active" (battery-powered) measurement system. The IC provides programmable trimming that determines: (a) if the part is active or passive, (b) to adjust temperature and pressure resolution, and (c) modulation index and coil clamping strength (when in the passive mode).

In the passive mode, the IC develops power from a reader/interrogator RF signal that is coupled to an external LC circuit across the transponder antenna inputs. The transponder uses the signal received to provide power and to generate an on-chip clock. The transponder sends back its memory contents to the reader by modulating the impedance of the antenna, which is known as "back scattered modulation". The reader demodulates the returned data to get the sensor identification ("ID") as well as sensor data and calibration constants needed to interpret the data.

The transponder sends a 196-bit serial phase-shift-keyed (PSK) data-stream as sixteen, 12-bit words. The first 12 bits are the programmable sync word, with each sync bit being 1.5 bits wide. Next, 144 bits of EEPROM are transmitted that are of normal bit width. The 144 bits contain the unique ID code of the transponder, the calibration constants for temperature and pressure data, and a CRC for error checking. The transponder then sends 36 bits of data: a 12-bit temperature count (NT), a 12-bit pressure count (NP), and a 12-bit word consisting of five unused bits as 1's, 1 bit for the state of the MTMS over-temperature sensor, and 6 bits of even-parity, with one bit of parity for every four bits of NP and NT data.

In the active mode, the transponder must be controlled by external hardware. The controlling hardware provides power to the IC and a clock signal via either the CLK or VB pads. The IC shifts out its data on the DATA pad on every falling edge of the clock. The clocks must be given at a precise clock rate so that temperature and pressure are collected during fixed periods of time and therefore, the hardware can optimize the clocking time per bit to get the highest resolution for temperature and pressure. The IC can operate down to as low as 2.8V in active mode.

As either a passive or active tag (transponder), the IC can be tested after assembly by applying power and talking to the chip via a 4-pin interface. This interface allows the user access to the chip's EEPROM and allows testing the chip functions. The EEPROM data can be read, cleared, or programmed and the oscillator tested by directly reading the frequency. The chip sensor oscillator can also be tested and provides a second method for reading temperature and pressure in the active mode.

Overview of the RFIQ™ Transponder Circuitry

FIG. 4A is comparable to FIG. 2, and is a block diagram of a relevant portion of an improved RFIQ™ transponder 400 (compare 102, 200), illustrating the following signals, terminals and functional blocks (sections), and their interconnections with one another. This exemplary system is described as an embodiment which preferably measures pressure and temperature, but it is within the scope of the invention to include measurement of other parameters which employ suitable sensors.

The transponder 400 is preferably implemented on a single integrated circuit (IC) chip shown within the dashed line 402 (compare 202), to which are connected a number of external components. Other dashed lines in the figure indicate major functional "blocks" ("sections") of the transponder 400, and include a block 438 (compare 238) of addressable memory, and a sensor interface section 406 (compare 206).

The components external to the IC chip 402 include an antenna system 410 (compare 210) comprising an antenna (coil) 412 and an optional capacitor 414 connected across the coil 412 to form an L-C resonant tank circuit, an external precision resistor (Rext) 416 (compare 216), an external pressure-sensing capacitor ($C_P$) 418 (compare 218), and an optional external maximum temperature measurement switch (MTMS) 420 (compare 220). Each external component has an appropriately labeled connection pad as shown in FIG. 4A: VA and VB for the antenna system 410; Rext, $C_P$ and MTMS for the high side of the precision resistor 416, the pressure-sensing capacitor 418, and the maximum temperature measurement switch 420, respectively. The ground connection for the analog external components Rext, $C_P$, and MTMS should be made via the analog ground AGND pad. The other ground pad (GND) is for the ground connection of external digital connections. The remaining connection pads are for use in active or test modes of transponder 400 operation as described hereinbelow.

The antenna 412 may be in the form of a coil antenna, a loop antenna, a dipole antenna, and the like. It is mainly used when the transponder 400 is in the passive mode. Alternatively, when the transponder 400 is in the active mode, the antenna system 410 may not be present, and the signal output by the transponder 400 may be provided via direct connection to a DATA pad. In the main hereinafter, a transponder having a coil antenna, and used in the passive mode is described.

The transponder IC 402 includes interface circuitry 422 (compare 222) for processing an RF signal, such as an un-modulated carrier signal of frequency Fi (e.g., 125 kHz) received by the antenna 412, and for rectifying the received RF signal so that it can be used to power the transponder 400 operating in passive mode. The signal processing includes passing on a suitable form of the incoming signal to be used for generating timing/clock pulses for the transponder 400, and also includes applying modulation to the carrier signal for transmission by the antenna system 410.

The rectified carrier signal is clamped to a maximum of approximately 13.0 volts to prevent breakdown of the IC 402 substrate. The clamped, rectified signal has a voltage Vpp which can be read at a VPP pad, and ranges from 0–13 volts. The Vpp voltage is then shunt-regulated to a maximum of 6.5 volts, and designated as supply voltage (or "input voltage") Vxx which can be read at a VXX pad. The Vxx voltage level follows the Vpp voltage, and is about 6.2 volts for a typical received RF signal. Voltage Vxx is regulated to prevent voltages high enough to potentially damage CMOS circuitry in the IC 402.

The voltage Vxx is provided to a power-on reset (POR) circuit 482 (which is new to this model transponder), and also to a regulation and bandgap reference circuit 423 (compare 222) for providing various voltage supplies to the circuitry on the IC chip 402.

The power-on reset circuit 482 is provided to ensure that the transponder 400 will not begin to record sensor readings or to transmit data until enough power is being supplied by the received carrier signal to allow proper functioning of the transponder 400. The POR circuit 482 evaluates the voltage Vxx level and outputs a reset signal which is not released until the Vxx voltage is deemed sufficient. If desired, such as for test purposes, the reset signal can be imposed from outside the chip 402 through an RES connection pad.

In the passive mode, as long as the supply voltage Vxx is sufficient (at least 4 volts as determined by the POR circuit 482), the regulation and bandgap reference circuitry 423 will regulate voltage Vxx to provide a regulated analog supply voltage Vcc of approximately 3 volts, with an operating range of 2.8 V (mininum voltage for a stable oscillator 452) to approximately 3.5 V. The digital supply voltage Vdd is regulated by a source follower connected to voltage Vcc and can supply current independently of voltage Vcc (compare with previous method as in FIG. 3B, described hereinabove). Voltage Vdd is typically about one threshold below Vcc, or approximately 2.5 volts, ranging from 1.2 V (minimum voltage for stable logic and memory operation) to approximately 3.5 V, and supplies both the digital logic and the EEPROM (memory) array 436 during reading. During transponder programming, voltages Vcc and Vdd are not affected by applying power to pad VPP. The voltages Vcc and Vdd can be read externally via their correspondingly-named connection pads (VCC and VDD). Also, in active (battery-powered) mode, the regulators can be overridden by applying external power to the VCC and VDD pads. Finally, for circuits which need a stable reference voltage, the regulation and bandgap reference circuit 423 provides a temperature-independent bandgap voltage Vbg. The reference voltage Vbg is also independent of the chip supply voltage Vxx as long as the voltage Vxx is above a minimum operating level. The regulation and bandgap reference circuit 423 will output a substantially temperature-independent voltage Vbg of approximately 1.20 volts over a transponder operating temperature range of, for example, −40 to 150 degrees C. The bandgap voltage Vbg is used as a reference voltage by the Vxx, Vcc and Vdd regulators 423 as well as the relaxation oscillator 452 and the power-on reset circuit 482.

The interface and rectification circuitry 422 also provides the received RF signal, preferably at the input frequency (Fi) it is received, to a timing and clock generator circuit 424 (compare 224, 226) which generates clock signals in a known manner for controlling the timing of other circuits on the IC chip 402. The generated clock signal is a 50% duty cycle square wave, preferably at frequency Fi, and is independent of any modulation applied to the antenna system 410 by the transponder 400 for the transponder's PSK transmission. The timing and clock generator circuit 424 also divides down the system clock to develop timing for addressing of the data in the addressable memory 438, and for the modulation. For example, the system clock frequency Fi is divided by two to determine the frequency of the PSK modulated return carrier signal. Other divisions of the frequency Fi are used for determining the baud rate for data transmission. In active or test modes of operation, the timing and clock generator circuitry can be bypassed or used as a buffer for direct input of the clock signal via a CLK pad or the VB antenna pad.

From the timing and clock generator 424 the various clock signals are passed to several control logic circuits: the column decoder 440 (compare 240), the column to data converter 441, and the row decoder & $N_T$, $N_P$ control 442 (compare 242) which control access to data stored in the addressable memory 438. The clock signals are also used by the row decoder & $N_T$, $N_P$ control 442 to control the timing of the relaxation oscillator 452 and the data capture circuitry 454, which generate and store the temperature $N_T$ and pressure $N_P$ readings (counts) in the temperature register 432 and pressure register 434. Thus the row decoder & $N_T$, $N_P$ control 442 functions as a "timing generator" secondary to the timing and clock generator 424.

The addressable memory block 438 includes an EEPROM array 436 (compare 236) and several hardware registers 432, 434, and 435 (compare 232 and 234). The EEPROM 436 is programmed with a variety of stored information which will be described in detail hereinbelow.

The last two rows of the EEPROM (e.g., rows 14 and 15) constitute a trimming bits section 436b which is programmed to store trimming information. The trimming information: (a) controls the scaling of the current (in the base-emitter voltage to current converter 450) supplied to the relaxation oscillator 452 to optimize the pressure and temperature count resolution, (b) sets the modulation index in the modulation circuit 446 to optimize signal transmission for a given antenna system 410 and for a given transponder application, (c) sets the mode of operation (active or passive), and (d) optimizes the impedance of a clamp on the voltage Vpp across the rectification circuit 422. Utilizing the trimming lines 485, the trimming information stored in the trimming bits 436b can be directly read by the circuits it affects (e.g., 450, 446, 484, 422, 482) at any time during transponder operation (active or passive). Alternatively, as in certain test and programming modes, the trimming bits 436b can be accessed for external reading and writing (programming) along with the rest of the EEPROM 436 memory via the DATA connection pad, as controlled by the test logic circuitry 484, and communicated by a transponder data line 444 through the column to data converter 441.

As described hereinabove with reference to the previous model transponder 200, the temperature and pressure registers (432 and 434 respectively) are each a hardware register holding the count (e.g., 12 bit) of a down-counter which is clocked by the sensor data signal of frequency Fosc' coming from the sensor interface section 406.

The parity, MTMS 435 section of memory is also new to this model of transponder 400. It is implemented as a register in hardware with, for example, 12 bits of stored data. Five bits are permanently set (value=1), then there is a bit which sets/clears according to the open/closed (1/0) status of the MTMS switch (closes if exposed to excessive temperature), and finally six bits registering the parity of the pressure and temperature counts: three parity bits for the pressure register 434 count $N_P$, and then three parity bits for the temperature register 432 count $N_T$. The parity bits are continuously updated during sensor data capture, following the changing counts in the $N_P$ and $N_T$ down-counters (the pressure 434 and temperature 432 registers, respectively). Each parity bit represents the parity of 4 sequential bits (a "nibble") in the corresponding pressure 434 or temperature 432 register; with the most significant parity bit representing the most significant nibble of the count, the middle parity bit for the middle nibble of the count, and the least significant parity bit for the least significant nibble of the count.

The sensor interface portion 406 (compare 206) of the transponder chip 402 consists of the base-emitter voltage to current converter 450 (compare 250) with connection pad "Rext"; the relaxation oscillator 452 (compare 252) with connection pad "C$_P$"; the data capture circuitry 454 (compare 254); and the "MTMS" connection pad and line 459 connecting it to the MTMS bit in the parity, MTMS register 435 (compare 236 for the previous location of the MTMS bit).

The base-emitter voltage to current converter 450 functions in a similar way to the converter 250 which is described in greater detail hereinabove with reference to sections 306 to 310 of FIG. 3. For improved performance, the circuitry of sections 306, 308 and 310 in the new base-emitter voltage to current converter 450 utilizes cascodes instead of single stage current mirrors (e.g., for transistors P1, P2, P4, P6), and the external resistor Rext 416 may have a different preferred resistance value, such as 500 kilohms. Cascodes are desirable because of their increased power supply rejection ration (PSRR). Also, in a feature to be described more fully hereinbelow with reference to FIG. 5, the final stage 510 (compare 310) of the base-emitter voltage to current converter 450 is connected in a different way to section 308, and works in conjunction with programmed settings in the trimming bits register 436b to provide a scaled proportional-to-temperature current I(T)B on the line 451, 511 (compare current I(T)/N on line 251, 311) to the relaxation oscillator circuitry 452 (compare 252). In contrast with the previous design, the current scaling circuit 510 (compare 310) can scale the current I(T) by a variable scaling factor "B", as determined by programmed settings in the trimming bits register 436b.

The relaxation oscillator 452, under the timing control of the row decoder & N$_T$, N$_P$ control circuit 442, works in conjunction with the external capacitive pressure sensor Cp 418 to generate a signal on line 453 (compare 253) with frequency Fosc' which is indicative of either the ambient temperature or the ambient pressure, depending on the timing window determined by the row decoder & N$_T$, N$_P$ control circuit 442. The data capture circuitry 454, under the timing control of the row decoder & N$_T$, N$_P$ control circuit 442, directs the Fosc' signal to the appropriate hardware register (depending on the timing window): to the temperature register 432 via line 455, or to the pressure register 434 via line 457.

The current scaling circuit 510 (part of the base-emitter voltage to current converter 450) and the relaxation oscillator 452 have improvements compared to the relaxation oscillator 252, and the MTMS 420 status is directed to a different memory location (register 435) than in the previous implementation (EEPROM 236). Otherwise, the sensor interface section 406 functions essentially the same as the corresponding section 206 in the previous model 3070C transponder 200.

As described hereinabove with reference to the previous model transponder 200, the term "ambient" refers to the parameter being measured in the vicinity of the transponder 400, or more particularly in the vicinity of the respective sensors associated with the transponder 400. Also, references made herein to "pressure readings", "pressure counts", "pressure response", "pressure register" and the like generally refer to "pressure" as measured by this transponder technique which actually produces a hybrid pressure-temperature reading. When this hybrid reading has been processed to remove its temperature component, the reading is referred to as a "pressure-only" reading.

In conjunction with the column decoder 440 and the row decoder 442, the column to data converter 441 controls the sequence in which signals (i.e., data) are output on a line 444 (compare 244) to a modulation circuit 446 (compare 246) which, via the interface and rectification circuitry 422 (compare 222), communicates selected measured tire operating characteristics in a data stream via the antenna system 410 to an external reader/interrogator (e.g., 106). The line 444 also communicates the data stream to the test logic circuit 484 where it can be directly accessed via the DATA connection pad.

The modulation circuit 446 converts the data stream from line 444 to a representative sequence of impedance changes (modulations) which are applied to the antenna system 410 through the interface and rectification circuit 422. A new feature of the transponder 400 of the present invention is the ability to modify the modulation index (magnitude of modulation) to suit operating power levels and to select (via the trimming bits 436b) a modulation index optimized for the individual transponder 400, antenna system 410, and reader/interrogator 106 in use.

In passive mode operation, an RF carrier signal from an external source (e.g., a reader/interrogator 106) is received by the antenna 412. This RF signal is rectified and used to power the RF transponder 400 as well as providing the timing/clock signals. Modulating information applied by the modulation circuit 446 is used to alter characteristics (e.g., impedance, resonant frequency, etc.) of the LC tank circuit of the antenna system 410. These alterations are sensed as changes in load by the external reader/interrogator 106 and are decoded, providing communication of data back from the RF transponder 400 to the external reader/interrogator 106. Because the transponder 400 passive power is derived from the received RF signal, and because modulation of that signal drains off some of that power, the POR circuit 482 maintains a reset signal during passive power-up, and will not clear the reset signal (thereby allowing modulation), until the transponder power levels are high enough to assure stable operation of the transponder 400 during modulation.

The test logic circuit 484 enables tests that can be performed at all phases of transponder production and use, including wafer sort, initial board assembly level programming, programming at the pre-calibration stage, calibration and trimming of the transponder, and post-calibration programming to adjust the trimming bits 436b for encapsulation-induced offset error.

More detailed explanations of significant portions of the RFIQ™ transponder 400 of this invention are presented in the following sections.

Memory Assignments and the Data Stream

The addressable memory block 438 is organized in a way which provides a data stream that is improved over that of the previous model 3070C transponder 200. The column decoder 440, the column to data converter 441, and the row decoder & N$_T$, N$_P$ control circuit 442 work together to control the flow of data in and out of the addressable memory block 438. When operating in the active or passive modes (i.e., not in a test or programming mode), the circuits 440, 441 and 442 access the memory locations one at a time in sequence from the first address to the last (most significant bit to the least significant bit in each data "word", with words sequenced from the lowest numbered word to the highest), thereby producing a serial string of data for transmission. It will be seen from the following description that the rows to be included in the data stream are selected according to the mode of operation (i.e., passive/active, or a variety of test and programming modes). An added function of the row decoder & $N_T$, $N_P$ control circuit 442 is to control the sensor interface circuitry 406 (via line 487) so that it is accumulating temperature-related counts in the temperature register 432 during one portion of the data transmission (e.g., while transmitting words/rows 2 through 6), and pressure-related counts in the pressure register 434 during another portion of the data transmission (e.g., while transmitting words/rows 9 through 13), both accumulations to be completed in time for the counts to be read back out of the registers 432 and 434 when their part of the data stream is due (e.g., words 14 and 15).

FIG. 4B (compare FIG. 3C) is a "map" of the addressable memory block 438, showing its physical organization (by "rows") and also showing the organization of the active or passive mode data stream (by "words"). In the preferred embodiment of transponder 400 described herein, each word or row is 12 bits (or columns) in length, and there are 16 words in the data stream, comprising a total of 192 bits (12 times 16). The drawing of the memory block 438 in FIG. 4A is helpful in understanding the physical organization. It should be noted that the rows 1 to 13 of physical memory (EEPROM 436) correspond to the words 1 to 13 of the data stream, but the rows 14 and 15 of physical memory (EEPROM 436) are not part of the data stream. Instead, the temperature register 432 is read out as word 14, and the pressure register 434 is read out as word 15 of the data stream. The final word of the data stream, word 16, is read out of a hardware register of physical memory (the parity, MTMS register 435).

The EEPROM 436 portion of the exemplary addressable memory block 438 comprises 180 cells arranged in a 12 column by 15 row array. Each cell is made up of at least one n-channel select gate and one corresponding EEPROM transistor. The first 13 rows (sync, I.D., calibration, CRC 436a) are readable in the normal read modes whether the transponder 400 is programmed to be active or passive. The EEPROM memory locations in these first 13 rows are selected in the usual way, with one n-channel transistor row selection gate per EEPROM transistor. The EEPROM cells at rows 14 and 15 (trimming bits 436b) hold the data for 12 bits of trimming information, and are configured differently to facilitate their special role in the transponder. Each trimming bits 436b EEPROM cell has two gates instead of one, adding a special READ_TRIM selection gate in series with the row selection gate so that the trimming bits 436b cannot be added to the data stream unless the READ_TRIM selection gate has been enabled as in certain test modes of transponder operation. Another feature of the special trimming bits 436b register is that each trimming bits 436b cell also has an added sensing line to communicate the EEPROM bit setting (programmed trimming information) to appropriate sections of the transponder 400 circuitry as needed.

Thus the EEPROM 436 and associated logic are structured so that: The trimming bits 436b data can be read externally by a "READ_TRIM" test mode which reads out the bits sequentially as words 14 and 15 in the data stream in place of the temperature and pressure counts. In a "READ" test mode, as in normal operation, the trim bits are not seen in the data stream, but are still accessed by sense amplifiers to communicate programmed trim settings to appropriate sections of the transponder 400. In a "WRITE" test mode, all the EEPROM 436 cells (including the trim bits 436b) are addressed simultaneously and are written to. This in effect writes '1's to all the EEPROM cells, giving them high thresholds. In an "ERASE" test mode, individual cells can be erased (programmed to '0', given a low, negative, threshold): as the clock CLK signal indexes through the EEPROM cell array, a cell at the intersection of the column addressed and the row addressed is erased by raising the voltage on the VPP pad to the programming voltage and enabling the erasure by raising the DATA pad high.

Referring to FIG. 4B, the map illustrates an exemplary organization wherein the first twelve data locations (bits 000 . . . 011 in row 1) are reserved for synchronization ("sync") data. The next forty-eight data locations (bits 012 . . . 059 in rows 2 through 5) are for general information identifying the individual transponder 400. As mentioned hereinabove, each transponder unit is suitably calibrated prior to its installation in a tire. The next twenty-four data locations (bits 060 . . . 083 in rows 6 through 7) hold temperature calibration data (e.g., a defining point and a slope). The next twenty-four data locations (bits 084 . . . 107 in rows 8 through 9) hold pressure calibration data (e.g., a defining point and a slope). The next thirty-six data locations (bits 108 . . . 143 in rows 10 through 12) hold additional identifying information concerning the IC chip 402. The next twelve data locations (in row 13) hold four bits of identifying information about the chip calibration (bits 144 . . . 147), and an eight bit value (bits 148 . . . 155) for a data validation algorithm such as CRC (Cyclic Redundancy Check). The next two words in the data stream (words 14 . . . 15, bits 156 . . . 179) are read from the temperature register 432 and the pressure register 434, respectively. The final word of the data stream (word 16, bits 180 . . . 191) is read from the parity, MTMS register 435, which contains five "open" bits (bits 180 . . . 184), then one bit (bit 185) containing the logic level (state) of the MTMS switch 420, and finally six bits (bits 186 . . . 191) containing 3 bits each for the parity of the pressure count followed by the parity of the temperature count. The five open bits are unused, and are fixed as logical "1" values.

The column decoder 440, column to data converter 441, and row decoder & $N_T$, $N_P$ control 442 circuits coordinate addressing and access to the addressable memory block 438.

The column decoder 440 consists of a four-bit synchronous counter that addresses a 1-of-12 decoder. The outputs from the column decoder 440 address the 12 columns of the memory array during programming and reading. To address a column, the address n-channel device routes a low power current-source to charge the addressed column. If a bit is written to, the column will be pulled high, but if erased, the column will be pulled low. The output of the current-source is buffered and drives a transponder data line 444 that goes through the column to data converter 441 to the modulation 446 and test logic 484 circuits. The columns are sequentially addressed from column 1 to column 12 at the rate of a timing logic clock signal provided either by the timing and clock generator 424, or externally via the CLK pad. After addressing column 12, the column decoder 440 triggers the row decoder & $N_T$, $N_P$ control 442 to clock it to the next row and also cycles itself back to column 1. Whenever a reset signal (turned on, then off) is received from the power-on reset circuit 482 (or via the RES pad), the column decoder 440 and the row decoder & $N_T$, $N_P$ control 442 will reset their addressing sequence to start at column 1 of row 1, i.e., the first bit or cell in the addressable memory block 438. The column decoder 440 serially addresses the EEPROM 436 array in any of the reading modes of operation or during erasing. In the WRITE test mode it has no effect, since the entire EEPROM memory is simultaneously addressed for the WRITE operation.

The row decoder & $N_T$, $N_P$ control 442 is a 4-bit synchronous counter that addresses a 1-of-16 decoder. The decoder addresses 13 rows of EEPROM data memory 436a from rows 1 though 13. In the WRITE, ERASE, and READ_TRIM test modes, it also addresses rows 14 and 15 of the EEPROM memory 436b for the trimming bits. During normal reading (active or passive mode), the decoder addresses the temperature 432 and pressure 434 hardware registers at row addresses 14 and 15, respectively. Regardless of operating mode, the row-16 address is directed to a special data row: the parity, MTMS 435 hardware register. In the READ and ERASE test modes each row is addressed sequentially on the falling edge of the last bit of the column decoder 440. In the passive or active mode, a reset signal sets the row decoder & $N_T$, $N_P$ control 442 to row 1, which is the sync word. In the WRITE mode, all the rows are simultaneously addressed, which pulls all select lines and control gates to voltage Vpp. As mentioned hereinabove, an added function of the row decoder & $N_T$, $N_P$ control circuit 442 is to control the sensor interface circuitry 406 so that it is accumulating temperature-related counts in the temperature register 432 and pressure-related counts in the pressure register 434 during their designated time periods (data collection windows).

Programmable Current Scaling

As described hereinabove for the previous model 3070C transponder 200, the scaled current I(T)/N which is input to the relaxation oscillator 312, 252 on line 311, 251 must be scaled by a fixed amount N determined by a ratio of physical areas for the current mirroring transistors such as P5 and P6 in the current scaling circuit 310 of FIG. 3. The physical areas were set during fabrication.

A portion of FIG. 5 illustrates an exemplary improved (programmable) current scaling circuit 510 which is part of the base emitter voltage to current converter circuit 450 of the RFIQ™ transponder 400 of this invention. The current scaling circuit 510 (compare 310) develops a scaled current I(T)B on line 511 (compare 311) wherein the scaling factor "B" can be programmed into the transponder 400 via certain of the trimming bits 436b at any time after transponder 400 fabrication. The current scaling is now separately programmable for the temperature measurement (e.g., temperature scaling factor $B_T$=1 or 1.5), and the pressure measurement (e.g., pressure scaling factor $B_P$=1 to 8.5 in 0.5 steps), making the current supplied to the relaxation oscillator 512 (compare 312) programmably increasable up to 1.5 or 8.5 times the proportional-to-ambient-temperature (PTAT) current I(T). By programming the current mirror in the current scaling circuit 510, the counts per degree or counts per PSI can be maximized programmably, thereby increasing the resolution and stability for temperature and pressure counts ($N_T$ and NP). As detailed hereinabove, it is particularly desirable to optimize the pressure count, therefore a large range of pressure scaling factors $B_P$ are made available for programming (trimming). The lesser range of temperature scaling factors $B_T$ is generally adequate to compensate for shifts in processing at the die level, as well as changes in the external precision resistor (REXT) 416. It is within the scope of this invention to provide, in a similar fashion, other suitable programmable scaling factor amounts for both the temperature $B_T$ and pressure $B_P$ scaling factors.

Referring to FIG. 5, the programmable current scaling circuit 510 is bounded by a dashed line. The transistor P6 is connected in a current-mirroring configuration with the transistor P1, P2 and P4 in the temperature sensing and current mirroring circuitry (comparable to 306 and 308 in FIG. 3, but only transistors P4 and N5 are shown in FIG. 5) such that these current mirror gates are connected via line 505 (compare 305) which supplies a reference voltage Pbias to the gate of transistor P6. Because of the current mirror connection, the current through transistors P4 and P6 will mirror the PTAT current I(T) through the external resistor Rext 416, 216. The voltage supply for the programmable current scaling circuit 510 is voltage. Vcc provided on line 503 (compare 303). As explained hereinabove, the voltage Vcc is regulated and substantially independent of temperature. The use of the analog supply voltage Vcc is an improvement over the previous (circuit 310) use of the digital supply voltage Vdd, because the voltage Vcc is "cleaner," not having any digital switching noise imposed on it. For the sake of simplicity, the transistors P4, P6, P6.05, P6.1, P6.2, and P6.4 are illustrated as single transistor. It is within the scope of this invention to implement these transistors as cascodes, as mentioned hereinabove for the transistors such as P1, P2 and P4 of the circuits 306 and 308 of FIG. 3. It should be understood that such cascode transistors used in a current-mirror arrangement would have separate bias lines (e.g., Pbias would be split into Pbias' and Pbias") connecting the gates of the transistors in each stage of the cascode current mirror.

As in the current scaling circuit 310, the transistors P4 and P6 are connected in a current-mirroring configuration. However, instead of the circuit 310 transistors P5 and P6 having a fixed ratio of physical areas to scale the mirrored current, in the programmable circuit 510 of this invention P4 (and transistors P1, P2 of circuit 306 and 308) with which P6 is mirror-connected. The physical area of transistor P6 is changed by additional scaling transistors (e.g., P6.05, P6.1, P6.2, and P6.4) which are added in parallel to transistor P6, and switched into use by switches under the control of certain of the trimming bits 436b and also control signals from the row decoder & $N_1$, $N_1$ control circuit 442. It should be understood that each of the transistors P4, P6.05, P6.1, P6.2, and P6.4 illustrated in FIG. 5 has a suitable physical area which could be determined by the size of an individual transistor, or could be the result of adding together the physical areas of multiple transistors combined in parallel and collectively labeled as "a single transistor". For example, transistor P5 which has a physical area of 1 (in arbitrary "units"), could be fabricated as one transistor with a physical area of 1.0 unit, or as two transistors in parallel, each having a physical area of 0.5 units. In the embodiment illustrated in FIG. 5, the transistors P4, P6, P6.05, P6.1, P6.2, and P6.4 each have their relative physical areas labeled as "A="n, where n is the physical area in arbitrary units. The transistors P4, P6, and P6.1 each have a physical area of 1.0 unit, and transistors P6.05, P6.2, and P6.4 have physical areas of 0.5, 2.0, and 4.0 units, respectively. It should be understood that since the mirrored transistors P1, P2 and P4 of FIG. 3 also have the same relative size as P6, then they also have a physical area of 1.0 unit. By switching in various combinations of these added transistors P6.05, P6.1, P6.2, and P6.4 ("P6.n"), combined physical areas from 0.0 to 7.5 units can be added to the area (1.0 units) of transistor P6 in increments of 0.5 units. As explained hereinabove, the ratio of physical areas of the mirrored transistors (e.g., the ratio (P6+P6.n)/P4) will cause the mirrored current I(T)B exiting the programmable current scaling circuit 510 on line 511 to be scaled up from PTAT current I(T) by a factor B which equals the ratio of total physical areas.

Each of the added transistors P6.n has one or more controlling semiconductor switches in series (scaling trim switches S5, S6, S7, S8, and S9; temperature scaling switch ST1; and pressure scaling switch SP1), illustrated herein as a box with the control input indicated by a line on one side. Two kinds of semiconductor switches are illustrated: inverting and standard (non-inverting). The switches ST1 and SP1 are standard semiconductor switches which could be implemented, for example, as N-channel transistors with the control signal going to its gate. Such a switch will conduct (switch "on" or "closed") when the control signal is high (voltage above ground such as logical "1", "true", or "set"), and will not conduct when the control signal is low (ground, logical "0", "false", or "cleared"). The switches S5, S6, S7, S8, and S9 are inverting semiconductor switches as indicated by the small circle at the control input. These switches could be implemented, for example, as P-channel transistors with the control signal going to its gate. Such a switch will conduct (switch "on" or "closed") when the control signal is low, and will not conduct when the control signal is high. The inverting switches S5, S6, S7, S8, and S9 are programmed "on" (closed) if the corresponding trim bit 5 to 9 is programmed as "cleared". It may be noted that in the embodiment of transponder 400 herein described, the trim bits 5–9 are the only "low-true" logic bits in the trimming bits 436b register. An advantage of using such P-channel transistor switches is that they will function sooner than N-channel transistor switches as voltage levels increase during transponder power-up. The trim bits are bit addresses in the EEPROM trimming bits register 436b, communicated via lines 485. In this example, trim bit 5 controls temperature count fine trimming, trim bit 6 controls pressure count fine trimming, and trim bits 7, 8, 9 control pressure count gross trimming. The setting for a scaling trim bit "n" is illustrated as a scaling trim bit control signal labeled "TRIMBIT_"n (i.e., scaling trim bit signals TRIMBIT_5 . . . TRIMBIT_9 for scaling trim bits 5 through 9). The non-inverting scaling switches ST1 and SP1 are controlled on/off by the signals CAPTURE_NT and CAPTURE_NP, respectively, coming on lines 487 from the row decoder & $N_T$, $N_P$ control circuit 442. The scaling switches ST1 and SP1 enable different scaled currents I(T)B to be used by the relaxation oscillator 452, 512 during the temperature measurement or pressure measurement periods (time windows $W_T$ and $W_P$, respectively). Thus the current scaling factor B will have a value $B_T$ (1 or 1.5) during the temperature measurement window $W_T$ (signal CAPTURE_NT is on), and will have a value $B_P$ (1 to 8.5 in 0.5 increments) during the pressure measurement window $W_P$ (signal CAPTURE_NP is on). Although FIG. 5 illustrates a serial arrangement of switches (e.g., S5 and ST1), it is within the scope of this invention to avoid accumulated switching losses in the I(T)B signal by using digital logic to combine control signals to control a single switch. For example, the CAPTURE_NT signal could be combined with an inverted TRIMBIT_5 signal by an AND gate, whose output would control switch ST1, thereby eliminating the switch S5.

Relaxation Oscillator

As described hereinabove for the previous model 3070C of transponder 200, the relaxation oscillator circuit 312, 252 produces a signal of frequency Fosc' which is determined by the alternate charging of two capacitances: $C_{FX1}$ and C for temperature readings, or $C_{FX1}$ and ($C_{FX1}$ plus $C_P$) for pressure readings. The charging rate of the capacitances is determined by the magnitude of the capacitances and the magnitude of the scaled current I(T)/N used to charge them. The discharge rate of the capacitances is not a factor because each discharges while the other is charging, and they discharge more rapidly than they charge due to low resistance discharge paths. The set-reset part of the relaxation oscillator 312 is triggered to flip-flop only when one of the capacitances charges to a voltage level just above the bandgap voltage Vbg.

A portion of FIG. 5 illustrates an exemplary improved relaxation oscillator circuit 512 (compare 312) which substantially constitutes the relaxation oscillator 452 of the RFIQ™ transponder 400 of this invention.

The circuit 512 is still a relaxation oscillator, and is driven by a scaled current (the measurement current) on line 511 (compare 311) from a now-programmable current scaling circuit 510 (compare 310) as described hereinabove. The set-reset portion 514 (compare 314a and 314b) of the relaxation oscillator 512, with phase paths φ1 and φ2 (phase one path 514a and phase two path 514b, respectively), functions in the same general way but has been slightly modified in known ways to accommodate the changes to the inputs of the comparators 516 (516a, 516b, compare 316a, 316b). The major circuit changes are to the front-end switching arrangement which has been divided into two measurement switching circuits 515a and 515b for temperature and pressure measurements, respectively. The capacitor $C_{FX2}$ has been eliminated, so that now the capacitor $C_{FX}$ (compare $C_{FX1}$) is used exclusively during the temperature measurement period, and the pressure sensing capacitor $C_P$ (418, compare 218) is used exclusively during the pressure measurement period. During a measurement period, the relaxation oscillator output signal frequency Fosc' is now determined by the alternating charging and discharging of a capacitor $C_{FX}$ or $C_P$, whichever is selected by the row decoder & $N_T$, $N_P$ control circuit 442. With the comparators 516a and 516b having reference voltages of, for example, Vbg and Vbg/2, respectively (the bandgap voltage and half the bandgap voltage), the selected capacitor $C_{FX}$ or $C_P$ will use the (scaled) measurement current I(T)B to be charged up to just above voltage level Vbg, which will trigger the set-reset circuit 514 to flip-flop from its first state (e.g., PHASE1=true) to a second state (e.g., PHASE2=true), which switches off the charging current I(T)B and instead diverts the scaled current I(T)B through a current mirror which causes the selected capacitor $C_{FX}$ or $C_P$ to be discharged by a mirrored current equivalent to I(T)B from voltage level Vbg down to just below a voltage level Vbg/2, which will trigger the set-reset circuit 514 to flip-flop again to the first state and begin charging the selected capacitor $C_{FX}$ or $C_P$ again. It can be seen that, after the initial charging from ground (zero volts) to voltage Vbg/2, the described operation will result in a uniform 50% duty cycle waveform with a frequency which is determined by the magnitudes of the scaled current I(T)B and the selected capacitor $C_{FX}$ (for temperature measurement) or $C_P$ (for pressure measurement). Another new feature of the relaxation oscillator 512, 452 of this invention is the provision of a small bias current Ibias which is switched in and mirrored to slowly drain-to-ground either of the capacitors $C_{FX}$ or $C_P$ when they are not selected for measurement use, and this grounding of the capacitors when not in use is also used to set the set-reset circuit 514 in a defined state before each time it is used for a measurement.

The exemplary relaxation oscillator circuit 512 has two analog inputs: the (programmably) scaled PTAT current I(T)B supplied on lines 511, and the bias current Ibias supplied on lines 513. The bias current Ibias is a small fraction of the PTAT current I(T) (e.g., I(T)/10) derived in a known way, such as the current scaling procedures described hereinabove.

The exemplary relaxation oscillator circuit 512 has two digital (logic or control) inputs supplied on lines 487 from the row decoder & $N_T$, $N_P$ control circuit 442: the CAPTURE_NT signal and the CAPTURE_NP signal which determine whether temperature or pressure, respectively, is being measured. Control signal inputs are indicated in several places by their corresponding number. For example, the CFX_TO_OSC signal is indicated by a number one in a circle where it is output from the LOGIC circuit 531 and also where it is input to switch ST2. The outputs of the phase paths φ1 and φ2 are used as control signals PHASE1 and PHASE2, respectively, and are also inverted and used as control signals: the phase path φ1 signal is inverted by the inverter 520a to produce the signal $\overline{\text{PHASE1}}$, and the phase path φ2 signal is inverted by the inverter 520b to produce the signal $\overline{\text{PHASE2}}$. The line above the name herein indicates that the logic is inverted, or "NOT", so that, for example, $\overline{\text{PHASE1}}$ means "not phase 1" (i.e., when the PHASE1 signal is high, or logic level 1, the $\overline{\text{PHASE1}}$ signal will be low, or logic level 0). The PHASE1, PHASE2, $\overline{\text{PHASE1}}$ and $\overline{\text{PHASE2}}$ signals are combined with the CAPTURE_NT and the CAPTURE_NP signals as inputs to a logic circuit 531 which outputs six control signals—two capacitor selection signals: CFX_TO_OSC (#1), and CP_TO_OSC (#2); and four measurement control signals: PHASE1_NT (#3), PHASE2_NT (#4), PHASE1_NP (#5), and PHASE2_NP (#6).

The details of the digital logic included in the logic circuit 531 are shown as the exemplary logic circuits 531a . . . 531f (for the signals (#1) . . . (#6), respectively) illustrated in FIG. 5A. Each of the logic circuits 531a . . . 531f utilizes a NAND gate and one inverter to produce its control signal to be output from the logic circuit 531. It is within the scope of this invention to include other forms of logic circuitry 531 which generate signals (#1) to (#6) which behave as described herein. It can be seen that the output signals (#1) and (#2) generally signify that it is time to measure one parameter ($N_T$ or $N_P$) and not the other ($N_P$ or $N_T$). Note that these signals will also be true (logical 1) whenever it is not time to measure the opposite parameter, regardless of the setting of the "capture . . . " signal. Thus, the signal CFX_TO_OSC (#1) is true whenever the signal CAPTURE NP is false; and the signal CP_TO_OSC (#2) is true whenever the signal CAPTURE $N_T$ is false. Since the (#1) and (#2) signals control the switches ST2 and SP2, respectively, it can be seen that this logic causes the switch ST2/SP2 to connect the capacitor CFX/CP to the set-reset circuit 514 whenever the opposite capacitor CP/CFX is not connected to the set-reset circuit 514. This helps keep the set-reset circuit 514 in a defined state at all times.

Each of the output signals (#3) to (#6) generally indicate the state of a signal which primarily determines, when true, which phase the oscillator is in (phase 1 or phase 2) and also which capacitor is in use for a measurement, if any ($C_{FX}$ for temperature, or $C_P$ for pressure). As can be seen in the illustrated exemplary NAND gate logic in FIG. 5A, each signal (#3) to (#6) will also be true whenever the opposite measurement is selected, or even if no measurement is selected, regardless of phase. For example, the NAND gate in logic circuit 531c outputs the signal PHASE1_NT (#3). If temperature is being measured, then PHASE1_NT will be high during phase 1 (charging $C_{FX}$) and low during phase 2 (discharging $C_{FX}$). However, when temperature is NOT being measured (i.e., CAPTURE_NT is low, not true), then PHASE1_NT will be high regardless of the phase of the oscillator, and even if neither temperature nor pressure are being measured. Similar logic applies to each of the four control signals (#3) to (#6), designated by the encircled numbers #3, #4, #5, and #6, and illustrated in FIG. 5A as logic circuit 531c to 531f.

The $\overline{\text{PHASE1}}$ signal, on line 521 (same as 453, compare 321 and 253) is also the (inverted) relaxation oscillator output signal Fosc' which is used by the transponder 400 to accumulate the temperature and pressure counts in the corresponding registers 432 and 434, respectively. It can be seen that the relaxation oscillator 512 output Fosc' is buffered and level-shifted to the digital logic signal level. The relaxation oscillator 512 can be tested or read directly by placing the transponder 400 in either of the (active mode) test states, "READ_TEMP" and "READ_PRESS". These test states enable the relaxation oscillator 512 for temperature or pressure, respectively, and direct the relaxation oscillator 512 signal Fosc' to the DATA pad.

The front end of the relaxation oscillator 512 consists of two essentially duplicate measurement switching circuits 515a and 515b, which utilize the temperature or pressure measuring capacitor, $C_{FX}$ or $C_P$ respectively, and a series switch ST2 or SP2, respectively, to connect the appropriate front end measurement switching circuit 515 to the set-reset circuit 514. As described hereinabove for switches ST1 and SP1, the switches ST2 and SP2 are standard (non-inverting) semiconductor switches, such as could be implemented using N-channel transistors, or in CMOS. The capacitors on chip 402 are poly-to-poly capacitors, which have very low temperature coefficients and have areas (capacitance) which give high resolution, but with low sensitivity to processing factors such as etching and mask alignment errors. The temperature measuring capacitor $CF)_x$ is a fixed poly-to-poly capacitor of, for example, 6 pf (+/−10%). The pressure measuring capacitor $C_P$ 418 (compare 218) is off-chip and preferably has similarly rugged and stable characteristics as described hereinabove (e.g., a touch mode capacitive pressure sensor with a linear capacitance versus absolute pressure response, varying between 4–40 pf).

The temperature measurement switching circuit 515a consists, for example, of P and N-channel transistors P9, P10, P13, N9, N10, N13, and N14; an inverter 517a, a semiconductor switch ST2 (such as an N-channel CMOS transistor), and the temperature measuring capacitor $C_{FX}$. The pressure measurement switching circuit 515b consists, for example, of transistors P11, P12, P14, N11, N12, N15, and N16; an inverter 517b; a semiconductor switch SP2, and the pressure measuring capacitor $C_P$ (418, external to transponder chip 402 and connected via connecting pad $C_P$). Various control inputs, described hereinabove, are connected to these measurement switching circuits 515 as indicated by the encircled numbers 1 to 6, and the currents Ibias and I(T)B are also input where shown.

The functioning of the temperature measurement switching circuit 515a will now be described for illustration of the techniques involved. The pressure measurement switching circuit 515b functions in a suitable parallel fashion.

When the transponder 400 places the relaxation oscillator 512 in a temperature measuring mode, the row decoder & $N_T$, $N_P$ control circuit 442 will set the CAPTURE_NT signal high (and the CAPTURE_NP signal low) for the time period $t_T$ it chooses as the temperature measurement window $W_T$, thereby closing the switch ST2 (and holding switch SP2 open) via the logic circuits 531a and 531b. The set-reset circuit 514 will start operation in phase 1 (i.e., the output of φ1, 514a is high; and the output of φ2, phase 2, 514b is low)

because whenever the relaxation oscillator is not being used for a measurement, the measurement switching circuits 515 are always forced to a low voltage (as will be explained hereinbelow) and this low voltage is presented to the comparators 516a and 516b due to the logic for signals #1 and #2 as explained hereinabove. With the signals PHASE1=true and PHASE2=false, the logic circuit 531 will output the following signals, identified by their encircled numbers: PHASE1_NT (#3), PHASE1_NP (#5), and PHASE2_NP (#6)=true; PHASE2_NT (#4)=false. These signals cause transistors P13 to be off and P9 to be on, thereby directing the scaled current I(T)B through P9 to charge the capacitor $C_{FX}$. Since switch ST2 is closed by signal (#1), the set-reset circuit 514 can sense the rising voltage on the capacitor $C_{FX}$. At the same time, transistor N14 is held on, grounding the gate of transistor N9 and holding it off so that there is no bleed-off path for the capacitor $C_{FX}$ being charged. Since transistors P10 and N13 are also held off, there is no other input to the gate of transistor N9, and the state of transistor N10 is of no consequence.

When the set-reset circuit 514 flip-flops to phase 2 (PHASE1=false, PHASE2=true), the signals PHASE1 $N_T$ (#3) will change to false, and PHASE2_NT (#4) will change to true (but PHASE1_NP (#5), and PHASE2_NP (#6) will remain "true"). These signals cause transistor P13 to be on and P9 to be off, thereby directing the scaled current I(T)B to transistor N10. Since transistor N13 is switched on, and transistor N14 is switched off, the transistor pair N10/N9 now forms a current mirror, so that the current passing through transistor N10 to ground is mirrored by an equivalent current draining the capacitor $C_{FX}$ through transistor N9 to ground. An unintended side effect of connecting the current Ibias through the now-turned-on bias control transistor P10 is that the current through transistors N10/N9 will be the sum of the scaled current I(T)B and the bias current Ibias, thereby slightly increasing the discharge rate of the capacitor $C_{FX}$ compared to the charging rate. Since the bias current Ibias is relatively small, this will change the relaxation oscillator 512 duty cycle to be slightly off of 50%–50%, but will not affect the counting process. (Compare the previous model transponder 200, described hereinabove, which operated with an intentionally asymmetric duty cycle.) Since switch ST2 is still closed by signal (#1), the set-reset circuit 514 can sense the decreasing voltage on the capacitor $C_{FX}$.

When the temperature measurement window $W_T$ is closed (transponder 400 is no longer in a temperature measuring mode), the row decoder & $N_T$, $N_P$ control circuit 442 will set the CAPTURE_NT signal low, causing the data capture circuit 454 to turn off data acquisition in the temperature register 432. The switch ST2 stays closed at this point (signal CFX_TO_OSC=1) because the CAPTURE_NP signal is still low. The switch ST2 will only open at another time if the CAPTURE NP signal is set high (and the CAPTURE_NT signal is low), i.e., pressure is being measured and not temperature. With the CAPTURE_NT signal low, the logic circuit 531 will cause both the signals PHASE1_NT (#3) and PHASE2_NT (#4) to be true. These signals cause both transistors P13 and P9 to be off, thereby cutting off the flow of the scaled current I(T)B through the temperature measurement switching circuit 515a. However, transistor N13 is switched on, and transistor N14 is switched off, so that the transistor pair N10/N9 still forms a current mirror, and the bias control transistor P10 is on so that the bias current Ibias passing through transistor N10 to ground is mirrored by an equivalent current draining the capacitor $C_{FX}$ through transistor N9 to ground. Since the (small) bias current Ibias is the only current allowed to flow through the mirror circuit N10/N9, the capacitor will be gradually drained to ground (0 volts) and held there until the next temperature measuring window $W_T$ is opened by making the CAPTURE_NT control signal high (true). It should also be noted that since the switch ST2 is still closed, the grounded inputs to the comparators 516a and 516b will force the set-reset circuit 514 to stop oscillation in the defined state of PHASE1 high, PHASE2=low. It is a feature of this invention to provide the herein described means of utilizing a small bias current Ibias to reset the measurement capacitors $C_{FX}$ and $C_P$ to defined states (zero-voltage) before each usage of the measurement capacitors $C_{FX}$ and $C_P$ to accumulate temperature counts $N_T$ or pressure counts $N_P$, respectively. It is a further feature of this invention to use the herein described means to additionally place the set-reset circuit 514 in a defined state before each use of the set-reset circuit 514.

It may be noted that the exemplary description hereinabove utilizes the control signals CAPTURE_NT and CAPTURE_NP for different purposes in different portions of the transponder 400 circuitry, e.g., in the base-emitter voltage to current converter 450 (current scaling circuit 510), in the relaxation oscillator 452 (512), and in the data capture circuit 454 (substantially the same as the circuit 254 illustrated in FIG. 3A). It is within the scope of this invention to modify the timing of the control signals to each of these circuits 450, 452, and 454 so that the events occur in a suitable sequence. For example, the circuit 454 may have a delayed turn-on (e.g., delay 1 bit-width time of 256 $\mu$sec) to allow the relaxation oscillator 512 time to reach stable operation, oscillating between the voltages Vbg/2 and Vbg on the measurement capacitors $C_{FX}$ and $C_P$.

As noted hereinabove for the typical passive mode operation of the transponder 400, the row decoder & $N_T$, $N_P$ control circuit 442 provides the control signals to the sensor interface circuitry 406 (via line 487) so that it is accumulating temperature-related counts in the temperature register 432 during one portion of the data transmission (e.g., while transmitting words/rows 2 through 6), and pressure-related counts in the pressure register 434 during another portion of the data transmission (e.g., while transmitting words/rows 9 through 13). To implement a delayed turn-on for the data capture circuit 454, the row decoder & $N_T$, $N_P$ control 442 could, for example, send the CAPTURE_NT signal to the programmable current scaling circuit 510 and also to the relaxation oscillator circuit 512 upon clocking to bit 1 of row 2, and then send a different "Capture Temp" signal to the data capture circuit 454 upon clocking to bit 2 of row 2. In like fashion, the CAPTURE_NT signal and the "Capture Temp" signal could be sent at different times, or even together (e.g., upon clocking to bit 1 of row 7).

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary sldll in the art to which the present invention most nearly pertains, and such variations are intended to be within the scope of the invention, as disclosed herein.

What is claimed:

1. An RF transponder comprising:
   a measurement current source for providing a measurement current to a relaxation oscillator, the relaxation oscillator comprising a measurement switching circuit, a set-reset circuit having a first phase path and a second phase path, and an output, characterized by:
   a logic circuit;
   a measurement capacitor disposed in the measurement switching circuit;
   a first transistor, controlled by the logic circuit, for directing the measurement current to the measurement capacitor for charging the measurement capacitor; and
   a current mirror having transistors controlled by the logic circuit, for mirroring the measurement current in a second transistor, for discharging the measurement capacitor;
   wherein the logic circuit provides measurement control signals for combining signals indicative of a phase of the set-reset circuit with signals from a timing generator for controlling alternating charging and discharging of the measurement capacitor according to the phase of the set-reset circuit.

2. An RF transponder, according to claim 1, characterized in that:
   the measurement current is indicative of a measured parameter; and
   the measurement capacitor has a fixed capacitance value and the relaxation oscillator output is a signal having a frequency indicative of the measured parameter.

3. An RF transponder, according to claim 2, characterized in that:
   the measured parameter is temperature.

4. An RF transponder, according to claim 1, characterized in that:
   the measurement capacitor has a capacitance value which varies indicative of a measured parameter and the relaxation oscillator output is a signal having a frequency indicative of the measured parameter.

5. An RF transponder, according to claim 1, characterized in that:
   the measurement current is indicative of a first measured parameter; and
   the measurement capacitor has a capacitance value which varies indicative of a second measured parameter and the relaxation oscillator output is a signal having a frequency indicative of both the first measured parameter and the second measured parameter.

6. An RF transponder, according to claim 5, characterized in that:
   the first measured parameter is temperature and the second measured parameter is pressure.

7. An RF transponder, according to claim 1, characterized by:
   a programmable current scaling circuit interposed between the measurement current source and the relaxation oscillator for scaling the measurement current provided to the relaxation oscillator.

8. An RF transponder, according to claim 7, characterized in that the programmable current scaling circuit comprises:
   at least one scaling trim switch controlled by a setting of at least one scaling trim bit, each scaling trim switch connected in series with at least one scaling transistor, for controlling the scaling of the measurement current.

9. An RF transponder, according to claim 7, characterized in that the programmable current scaling circuit comprises:
   a power supply which is an analog voltage supply.

10. An RF transponder, according to claim 1, characterized by:
    a first comparator in the first phase path having a negative input connected to a first fixed reference voltage, and having a positive input connected to a charged side of the measurement capacitor; and
    a second comparator in the second phase path having a positive input connected to a second fixed reference voltage which is smaller than the first fixed reference voltage, and having a negative input connected to a charged side of the measurement capacitor.

11. An RF transponder, according to claim 1, characterized by:
    a bias control transistor, controlled by the logic circuit, for connecting a small bias current to the current mirror for discharging the measurement capacitor.

12. An RF transponder comprising:
    a measurement current source for providing a measurement current to a relaxation oscillator, the relaxation oscillator comprising a set-reset circuit having a first phase path and a second phase path, and an output, characterized by:
    a first measurement switching circuit having an output and a second measurement switching circuit having an output;
    a logic circuit;
    a first measurement capacitor disposed at the output of the first measurement switching circuit;
    a first switch, controlled by the logic circuit, for connecting the output of the first measurement switching circuit to the set-reset circuit;
    a second measurement capacitor disposed at the output of the second measurement switching circuit;
    a second switch, controlled by the logic circuit, for connecting the output of the second measurement switching circuit to the set-reset circuit;
    a first transistor, controlled by the logic circuit, for directing the measurement current to the first measurement capacitor for charging the first measurement capacitor;
    a first current mirror, having transistors controlled by the logic circuit, for mirroring the measurement current in a second transistor, for discharging the first measurement capacitor;
    wherein the logic circuit provides first measurement control signals for combining signals indicating a phase of the set-reset circuit with signals from a timing generator for controlling alternating charging and discharging of the first measurement capacitor according to the phase of the set-reset circuit;
    a third transistor, controlled by the logic circuit, for directing the measurement current to the second measurement capacitor for charging the second measurement capacitor;
    a second current mirror, having transistors controlled by the logic circuit, for mirroring the measurement current in a fourth transistor, for discharging the second measurement capacitor;
    wherein the logic circuit provides second measurement control signals for combining signals indicating the phase of the set-reset circuit with signals from the timing generator for controlling alternating charging and discharging of the second measurement capacitor according to the phase of the set-reset circuit; and
    wherein the logic circuit provides capacitor selection signals for combining signals from the timing generator for controlling the opening and closing of the first and second switches.

13. An RF transponder, according to claim 12, characterized in that:
- the measurement current is indicative of a measured parameter; and
- the first measurement capacitor has a fixed capacitance value, and the relaxation oscillator output is a signal having a frequency indicative of the first measured parameter, when the first switch is closed and the second switch is open; and
- the second measurement capacitor has a capacitance value which varies indicative of a second measured parameter, and the relaxation oscillator output is a signal having a frequency indicative of both the first measured parameter and the second measured parameter, when the first switch is open and the second switch is closed.

14. An RF transponder, according to claim 13, characterized in that:
- the first measured parameter is temperature and the second measured parameter is pressure.

15. An RF transponder, according to claim 12, characterized by:
- a programmable current scaling circuit interposed between the measurement current source and the relaxation oscillator for scaling the measurement current provided to the relaxation oscillator.

16. An RF transponder, according to claim 15, characterized in that the programmable current scaling circuit comprises:
- at least one temperature scaling trim switch, controlled by a setting of at least one temperature scaling trim bit, each temperature scaling trim switch connected in series with at least one scaling transistor;
- at least one temperature scaling switch, controlled by a capture temperature signal from the timing generator, each temperature scaling switch connected in series with at least one of the at least one scaling transistors, for controlling the scaling of the measurement current when both a one of the at least one temperature scaling trim switches and a corresponding one of the at least one temperature scaling switches are closed; and
- at least one pressure scaling trim switch, controlled by a setting of at least one pressure scaling trim bit, each pressure scaling trim switch connected in series with at least one scaling transistor;
- at least one pressure scaling switch, controlled by a capture pressure signal from the timing generator, each pressure scaling switch connected in series with at least one of the at least one scaling transistors, for controlling the scaling of the measurement current when both the at least one pressure scaling trim switch and the at least one pressure scaling switch are closed.

17. An RF transponder, according to claim 16, characterized in that the programmable current scaling circuit further comprises:
- a combination of each one of the at least one temperature scaling trim switches and a one of the at least one temperature scaling switches, thereby forming a single switch for each one of the at least one temperature scaling trim switches controlled by both the at least one temperature scaling trim bit and the capture temperature signal; and
- a combination of each one of the at least one pressure scaling trim switches and a one of the at least one pressure scaling switches, thereby forming a single switch for each one of the at least one pressure scaling trim switches controlled by both the at least one pressure scaling trim bit and the capture pressure signal.

18. An RF transponder, according to claim 15, characterized in that the programmable current scaling circuit comprises:
- a power supply which is an analog voltage supply.

19. An RF transponder, according to claim 12, characterized by:
- a first comparator in the first phase path having a negative input connected to a first fixed reference voltage, and having a positive input connected to the charged side of the first and second measurement capacitors, as selected by the first and second switches; and
- a second comparator in the second phase path having a positive input connected to a second fixed reference voltage which is smaller than the first fixed reference voltage, and having a negative input connected to the charged side of the first and second measurement capacitors, as selected by the first and second switches.

20. An RF transponder, according to claim 12, characterized by:
- a first bias control transistor, controlled by the logic circuit, for connecting a small bias current to the first current mirror for discharging the first measurement capacitor; and
- a second bias control transistor, controlled by the logic circuit, for connecting the small bias current to the second current mirror for discharging the second measurement capacitor.

21. A method of generating an oscillating measurement signal in an RF transponder, the RF transponder comprising a relaxation oscillator having at least one measurement switching circuit, wherein the frequency of the oscillating measurement signal is indicative of a measured parameter; the method characterized by:
- providing a measurement current to the at least one measurement switching circuits;
- providing a measurement capacitor in each one of the at least one measurement switching circuits; and
- alternately directing the measurement current to the measurement capacitor for charging the measurement capacitor and directing a mirrored measurement current to the measurement capacitor for discharging the measurement capacitor.

22. Method, according to claim 21, characterized by:
- scaling the measurement current, wherein a current scaling factor is determined by programmed settings and by a type of the measured parameter, thereby adjusting the frequency of the oscillating measurement signal for optimizing a reading of the measured parameter.

23. Method, according to claim 21, characterized by:
- placing the measurement capacitor of each of the at least one measurement switching circuits in a defined state when each of the at least one measurement switching circuits is not in use for a measurement, by mirroring a small bias current for discharging the measurement capacitor while the at least one measurement switching circuit is not in use for a measurement.

24. Method, according to claim 21, characterized by:
- directing the output of the at least one measurement switching circuit to a set-reset circuit; and
- placing the set-reset circuit in a defined state when it is not in use for a measurement by grounding the at least one measurement switching circuit output while the set-reset circuit is not in use for a measurement.

25. Method, according to claim 21, characterized by:
- providing a delay between the time when the relaxation oscillator starts and the time when the oscillating measurement signal is directed to a measurement counter/register, thereby permitting the relaxation oscillator to stabilize before a reading of the measured parameter begins.

* * * * *